United States Patent [19]

Diaz-Plaza

[11] Patent Number: 5,429,513
[45] Date of Patent: Jul. 4, 1995

[54] INTERACTIVE TEACHING APPARATUS AND METHOD FOR TEACHING GRAPHEMES, GRAPHEME NAMES, PHONEMES, AND PHONETICS

[76] Inventor: Ruth R. Diaz-Plaza, 431 Rankin Rd., Mary Esther, Fla. 32569

[21] Appl. No.: 194,477

[22] Filed: Feb. 10, 1994

[51] Int. Cl.⁶ .......................... G09B 1/00; G09B 19/00
[52] U.S. Cl. .................................... 434/167; 434/156; 434/169; 364/419.01; 273/302
[58] Field of Search ............... 434/118, 156, 167, 169, 434/178, 185, 313; 385/2.69, 2.79; 364/419.01; 273/302; 283/46; 381/51, 52

[56] References Cited

U.S. PATENT DOCUMENTS

| | | | |
|---|---|---|---|
| 4,270,284 | 6/1981 | Skellings | 434/156 |
| 4,650,423 | 3/1987 | Shrague et al. | 434/156 |
| 4,713,008 | 12/1987 | Stocker et al. | 434/156 X |
| 4,970,659 | 11/1990 | Breedlove et al. | |
| 5,220,531 | 6/1993 | Blyth et al. | |

FOREIGN PATENT DOCUMENTS 8101478  5/1981  WIPO .................. 434/167

*Primary Examiner*—Joe H. Cheng
*Attorney, Agent, or Firm*—Baker & Botts

[57] ABSTRACT

An interactive teaching apparatus and a method for teaching graphemes, i.e., letter symbols of an alphabet; grapheme names, phonemes; and phonetics are disclosed. The apparatus comprises a display of graphemes wherein each of the letters is color-coded with at least one of a plurality of distinctive colors. Each of the distinctive colors corresponds to a characteristic of sound production associated with at least one phoneme or speech sound of at least one of the graphemes. The letters are accompanied by a plurality of visually perceivable images, each of which is positioned adjacent to at least one of the graphemes and has a name including at least one phoneme of at least one adjacent grapheme. The apparatus also includes a plurality of individually-activated, sound generating devices, each of which is associated with one of the graphemes and generates the name or at least one phoneme associated with the grapheme. The apparatus further includes a sound pattern generating device for generating patterns of sounds comprising more than one of the names or the phonemes generated by the plurality of sound generating devices. An interactive teaching method for teaching graphemes, grapheme names, phonemes, and phonetics comprises the steps of utilizing a display of graphemes, such as that described above to learn the phonemes associated with the letters used to form words, and forming words, phrases, and sentences phonetically with a set of cards. Each of the cards depicts at least one of the graphemes and the image positioned adjacent to the grapheme on the display. Each card also is color-coded with the same distinctive color used to color-code the grapheme on the display.

17 Claims, 15 Drawing Sheets

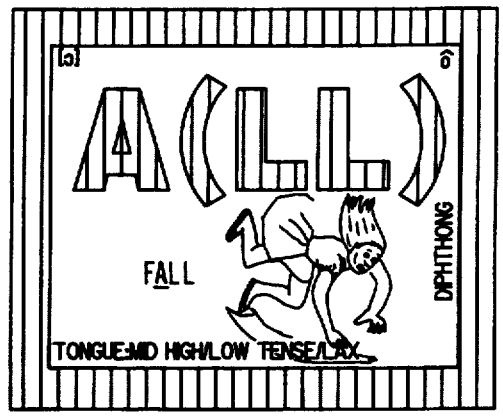
FIG. 5B
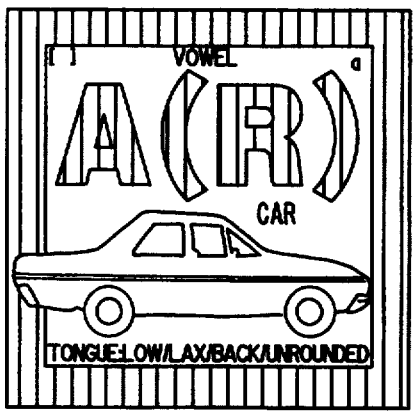
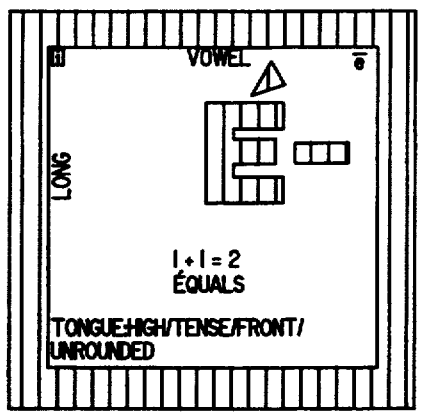
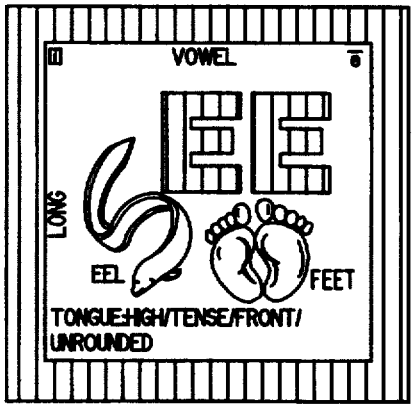
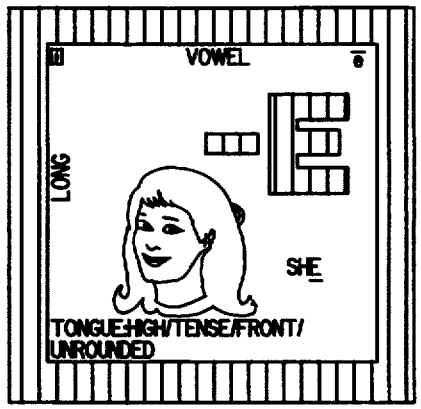
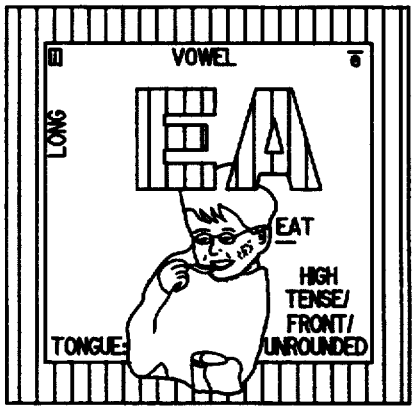
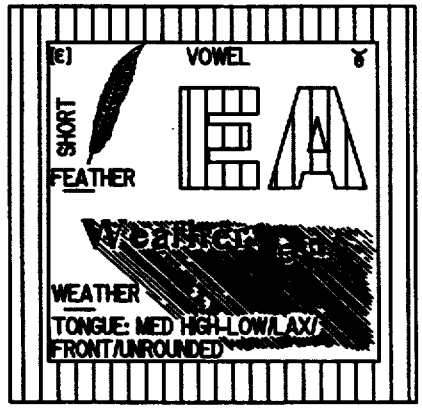

FIG. 5C
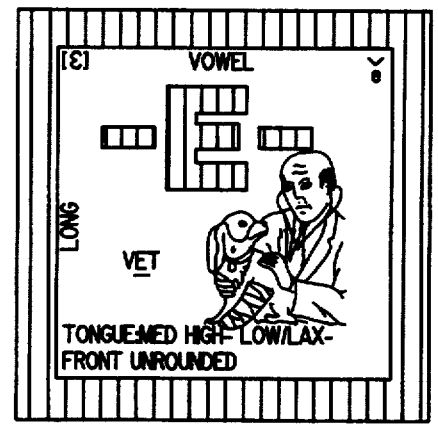
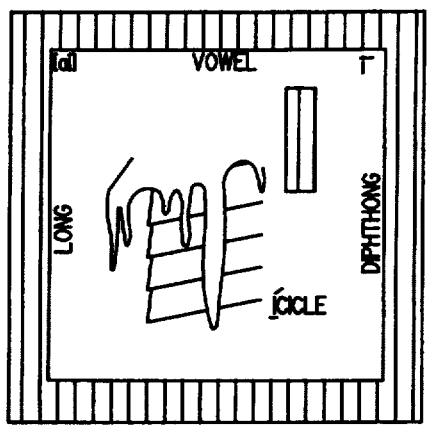
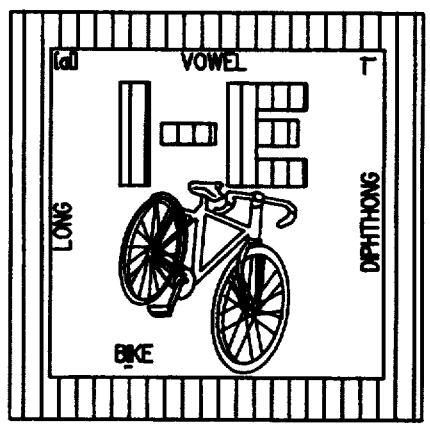
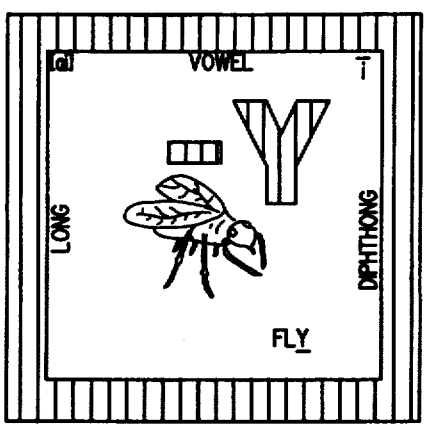
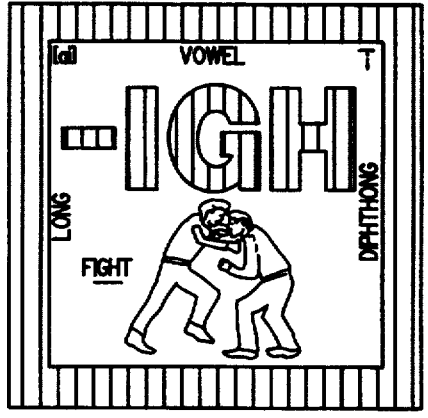
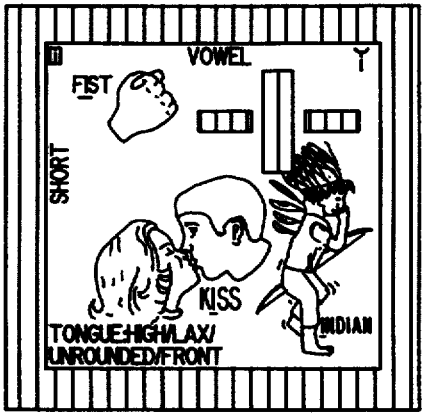
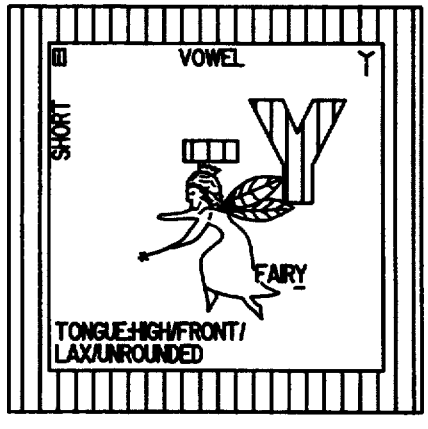
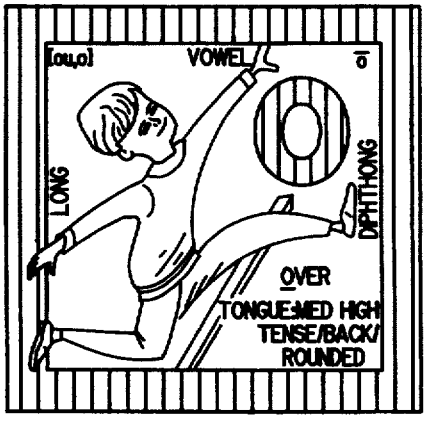

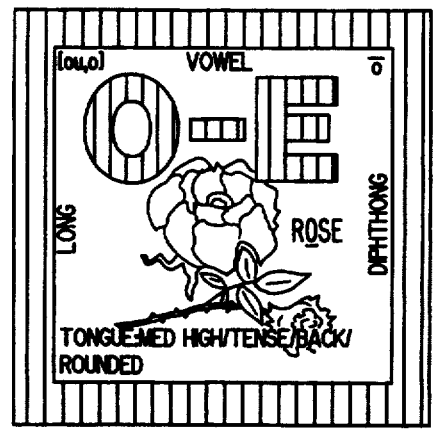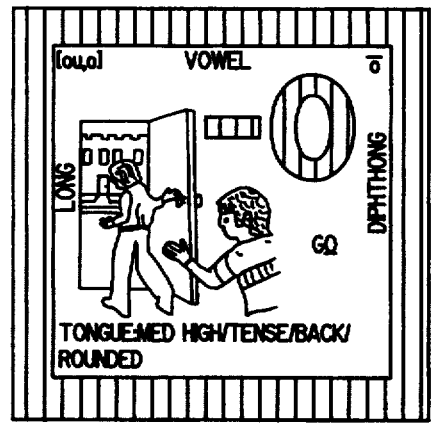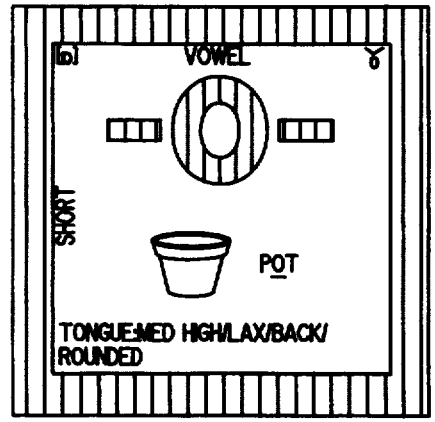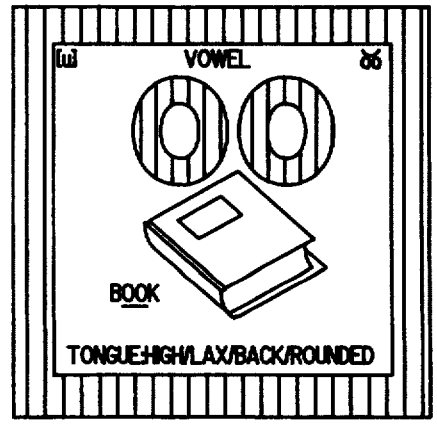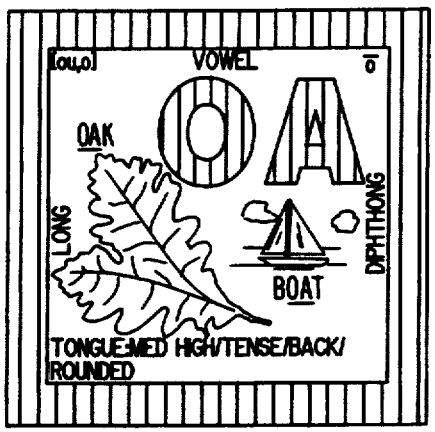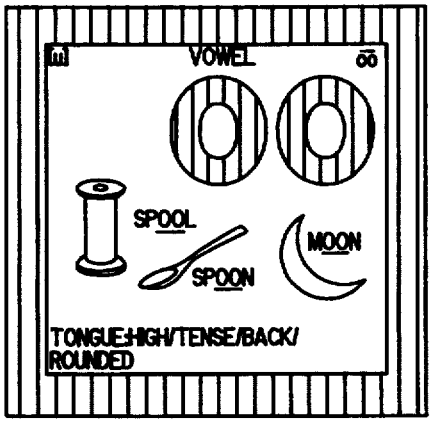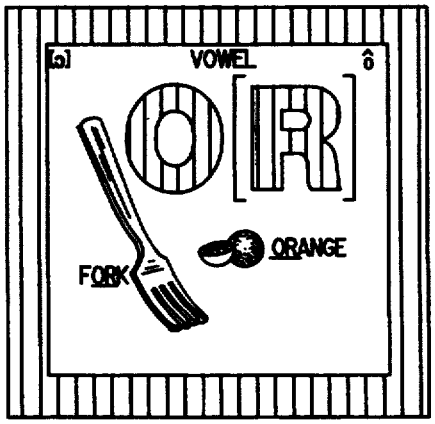
FIG. 5D

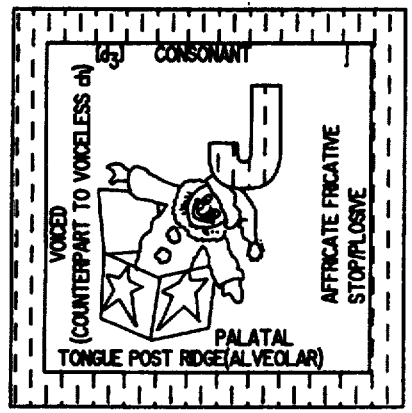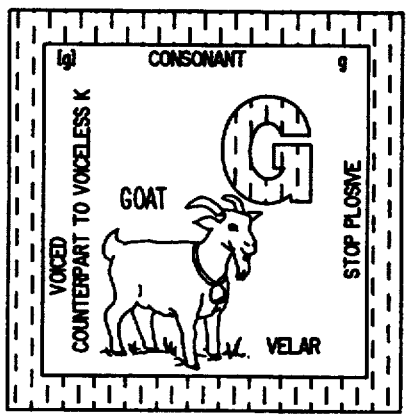
FIG. 5F
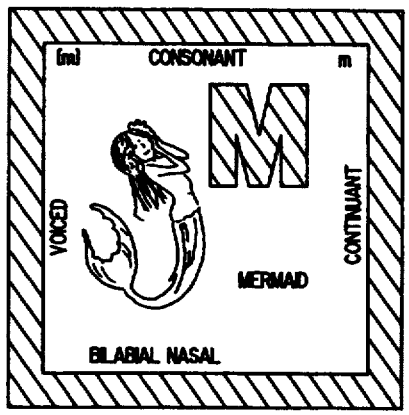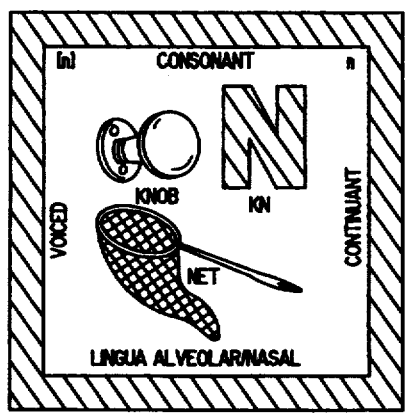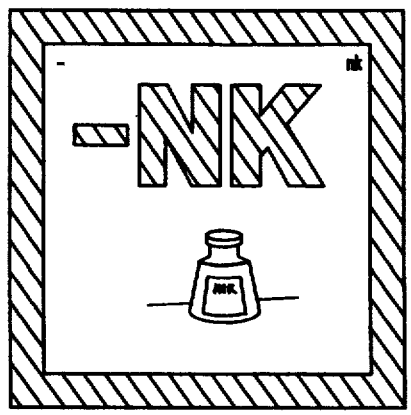

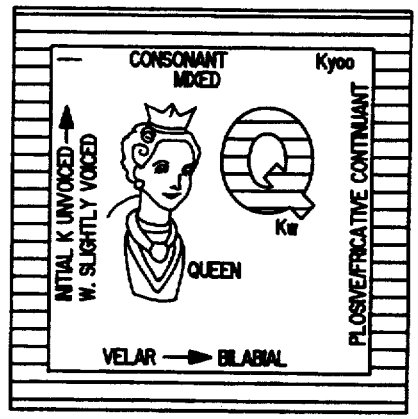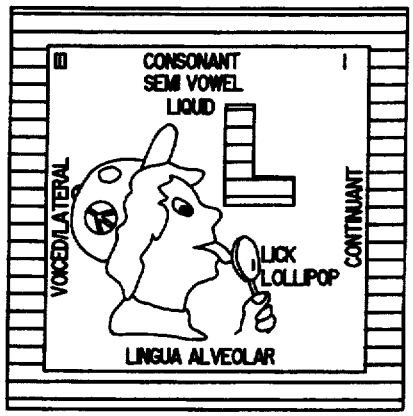
FIG. 5H
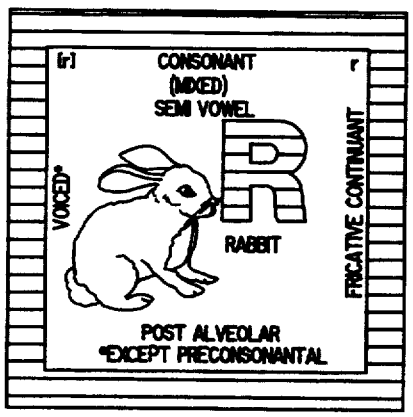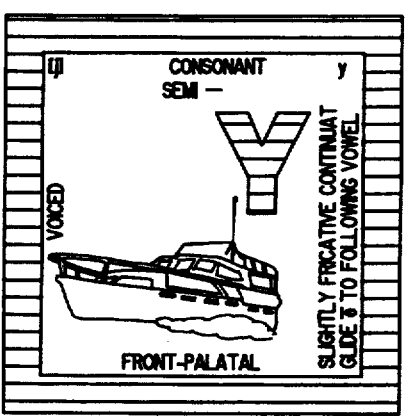
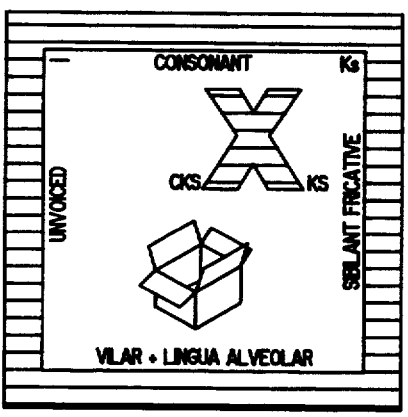
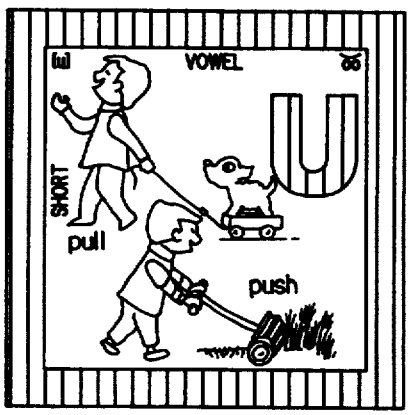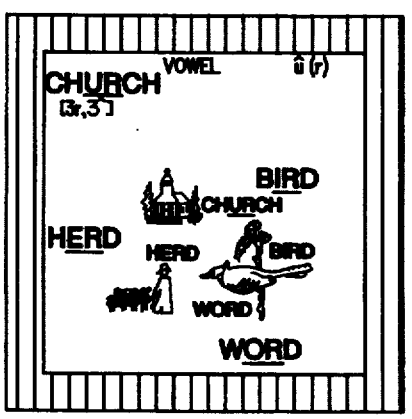

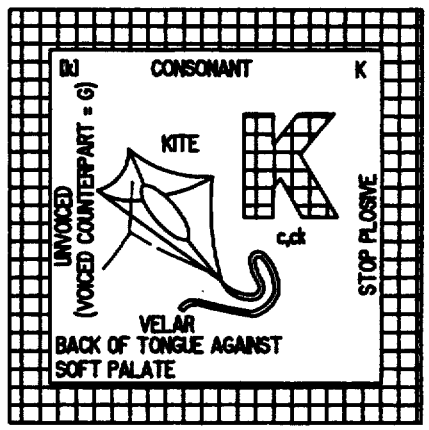
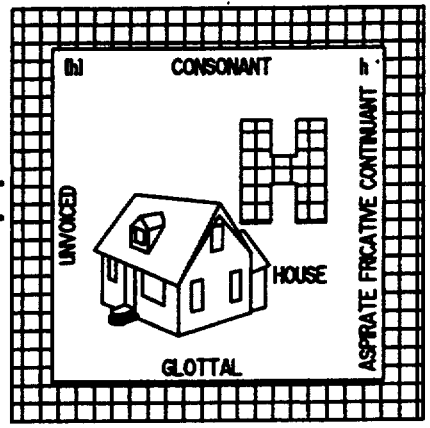
FIG. 5 I
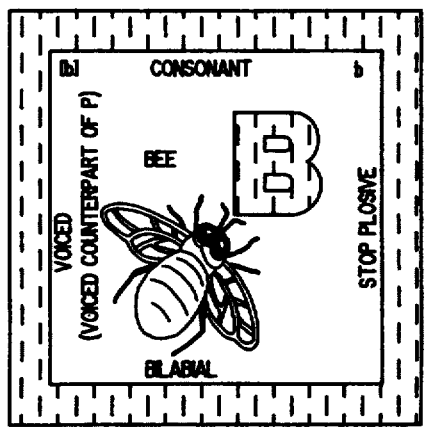
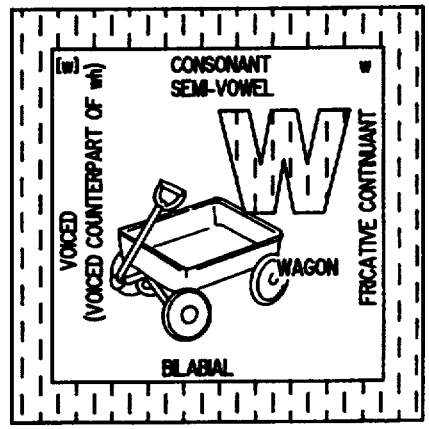
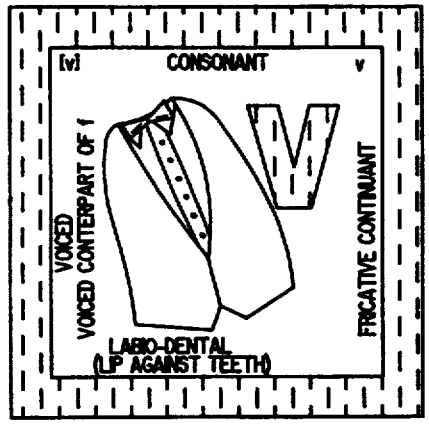
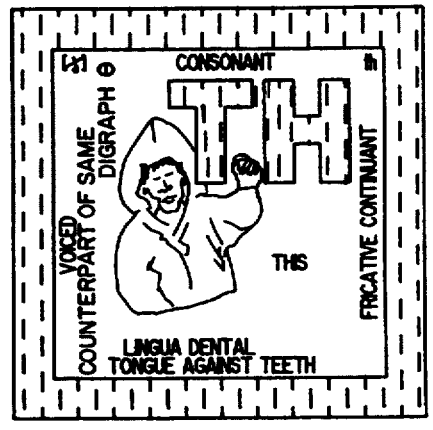
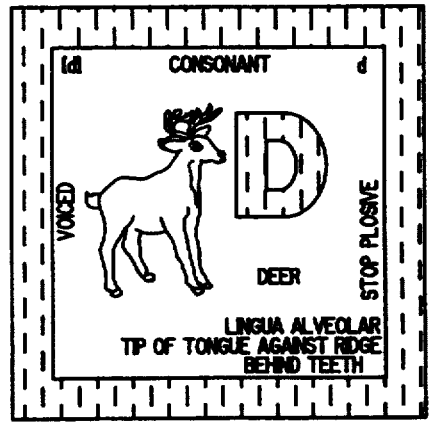
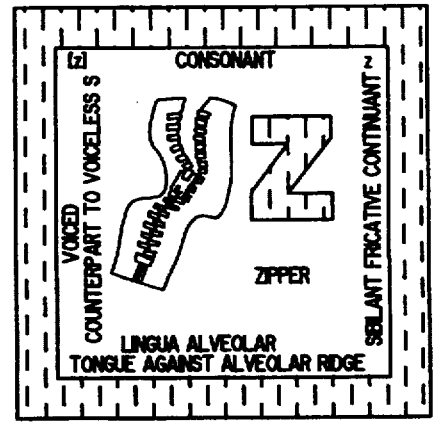

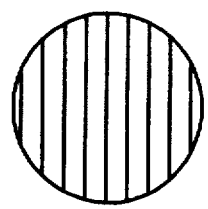 RED
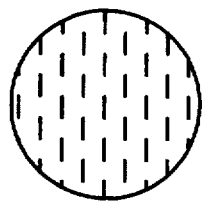 PINK
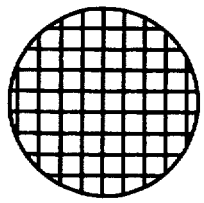 YELLOW
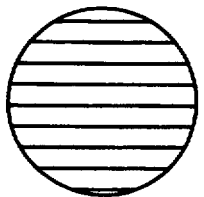 BLUE
FIG. 6
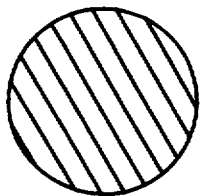 GREEN
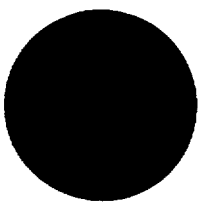 BLACK
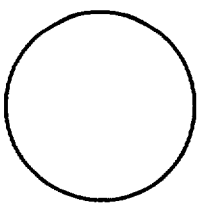 WHITE

INTERACTIVE TEACHING APPARATUS AND METHOD FOR TEACHING GRAPHEMES, GRAPHEME NAMES, PHONEMES, AND PHONETICS

BACKGROUND OF THE INVENTION

1. Field of the Invention

The invention relates to interactive teaching apparatus and methods for teaching graphemes, i.e., letter symbols of an alphabet; grapheme names; phonemes; and phonetics and in particular, to such apparatus and methods which use a combination of visual images, color-coding, and sound and sound pattern generating devices. Further, the present invention relates to apparatus and methods combining educational and recreational features.

2. Description of the Related Art

Although often thought of and taught as separate disciplines, reading, writing (and spelling), and speech (i.e., phonetics) are not separate and distinct subjects. Instead, they are essentially inseparable components of literacy. Phonetics is the study of speech sounds, i.e., phonemes, and, generally, a teaching method by which students may learn to read, write (and spell), and speak a language correctly in the same steps. By using phonetics, students can learn to hear the different sounds in the spoken phonemes and words and to sound out words for more accurate spelling and pronunciation.

Almost any language may be taught phonetically. The English language, however, is one of the most difficult languages to learn to read and speak because the sounds of the graphemes vary, and there sometimes seems to be little apparent correlation between the graphemes or combinations of graphemes and the sounds produced. This apparent lack of uniformity of sound production often has led to learning by rote or by the memorization of complex rules, or possibly, a combination of both. Various attempts have been made to simplify and explain pronunciation. See Webster's Ninth New Collegiate Dictionary, 32-39 (1990). Nevertheless, because English is a predominantly phonetic language, it may be simpler and, therefore, preferred to teach English with phonics, i.e., the use of sound or the phoneme-grapheme relationships in teaching reading. As noted above, however, most languages may be taught effectively with phonics.

Phonics have been incorporated into teaching systems in a variety of ways. Color-coding has been used to distinguish between various groups of graphemes. For example, a color-coded symbol system has been applied to the graphemes of the English alphabet to indicate the different sounds of letters in different words and, thereby, simplify pronunciations. Another example is a vowel sound teaching device which uses color-coded letters and combinations of letters on overlapping wheels to teach word pronunciations. In yet another example, an educational device employs color-coded cards using three colors to aid in the teaching of the mechanics of reading. The cards are intended to help students learn the alphabet, i.e,, the system of graphemes associated with a written language, sounds of the graphemes, and word pronunciation skills. Nevertheless, these systems fail to provide an interactive, phonetic teaching apparatus for teaching graphemes, grapheme names, phonemes, and phonetics.

Electronic talking games and educational devices have also been used to teach spelling, foreign languages, and the like. An example of such an electronic talking game is "SPEAK & SPELL" manufactured by Texas Instruments which provides an audible stimulus, such as the pronunciation of a word, and requires the user to spell the word. In another mode of operation, the "SPEAK & SPELL" game requires a word pronounced by a machine to be repeated by the user via a keyboard, or requires the user to enter an unknown randomly generated word into the machine via a keyboard. If the user accomplishes this task with fewer than a prescribed number of errors, the machine acknowledges the user's success.

Despite these related art designs, educators have long sought to develop apparatus for effectively teaching the basic elements and mechanics of reading, writing (and spelling), and speech which would be suitable for use by children and adults. Preferably, such apparatus would be interactive and portable, so that it could be used by users with various skill levels, and teaching could occur at the pupil's own pace and pleasure. Further, such apparatus would preferably be suitable for use by immigrants and foreigners, who may have little or no previous experience with the language being taught, or for use by the mentally or physically disabled.

SUMMARY OF THE INVENTION

It is an object of the present invention to provide a teaching apparatus to aid children and adults in learning to read, write, and speak. It is a feature of this invention that such apparatus teaches basic language elements, such as an alphabet and grapheme names and phonemes associated with them. A "phoneme" is a unit of significant sound in a specified language, e.g., English. It is an advantage of this invention that reading, writing (and spelling), and speech, i.e., phonetics, may be taught in a unified manner.

It is another object of the present invention that the apparatus will be both attractive and interesting to its users, especially children. This may be accomplished by the color-coding the graphemes and placing images, the names of which contain a phoneme associated with a grapheme, adjacent to that grapheme. It is an advantage of using color-coded graphemes that the similarities and differences between the sounds produced by and the characteristics of sound production, i.e., distinctive features, of various graphemes will be reinforced, and the colors will serve as a memory aid to help fix these distinctions in the pupil's mind. Another feature of this invention is the use of individually activated, sound generating devices. It is an advantage of this feature that the similarities and differences between graphemes are aurally reinforced. Similarly, the use of images, the names of which contain phonemes of associated graphemes, has the advantage of visually and aurally reinforcing the distinctions between graphemes.

It is yet another object of the present invention that the apparatus is portable. Thus, features of this invention may include that the apparatus comprise a board or display and that the board or display be constructed from plastic, plastic by-products, reinforced cardboard, or similar rigid and light weight materials. Additionally, the apparatus is preferably interactive and may employ user activated audio chips. It is an advantage of these features that pupils may improve their reading, writing (and spelling), and speech at their own level, pace, and pleasure. Because the apparatus is portable, it may be used by pupils in a classroom setting or at home, or virtually anywhere else. This permits frequent reinforcement of the lessons taught by the apparatus.

It is a further object of the present invention that the apparatus provides recreation for users. It is a feature of the invention that the aural and visual stimulation and interactive elements will interest and occupy children and many adults. It is an advantage of the invention that it appeals to a variety of senses and that it is sufficiently lightweight and portable that it can easily be carded by most children.

The present invention is an interactive teaching apparatus for teaching graphemes, grapheme names, phonemes, and phonetics. The apparatus comprises a display of graphemes wherein each of the graphemes is color-coded with at least one of a plurality of distinctive colors, and each of the distinctive colors corresponds to a characteristic of sound production i.e., distinctive feature, associated with at least one phoneme of at least one of the graphemes. Graphemes may include individual alphabet symbols, such as A or a, B or b, etc., and digraphs. Digraphs may include two or more symbols but express one sound, e.g., sh or ea. Each of a plurality of visually perceivable images is positioned adjacent to at least one of the graphemes, such that the adjacent image has a name including at least one phoneme of the at least one adjacent grapheme. The apparatus also includes a plurality of individually-activated, sound generating devices, each of which is associated with one of the graphemes and generates the name of the grapheme. The apparatus further includes at least one sound pattern generating device for generating patterns of sounds comprising more than one of the names generated by the plurality of sound generating devices.

In another embodiment of the present invention, the apparatus comprises a display of graphemes wherein each of the graphemes is color-coded with at least one of a plurality of distinctive colors and each of the distinctive colors corresponds to a characteristic of sound production associated with at least one phoneme of at least one of the graphemes. Each of a plurality of visually perceivable images is positioned adjacent to at least one of the graphemes, such that the adjacent image has a name including at least one phoneme of at least one adjacent grapheme. The apparatus also includes a plurality of individually-activated, sound generating devices, each of which is associated with at least one of the graphemes and generates at least one phoneme of the at least one grapheme. The apparatus further includes at least one sound pattern generating device for generating patterns of sounds comprising more than one of the phonemes generated by the plurality of sound generating devices.

In yet another embodiment of the present invention, an interactive teaching method for teaching graphemes, grapheme names, phonemes, and phonetics comprising the step of utilizing a display of graphemes to learn the names and phonemes associated with the graphemes used to form words. Each of the graphemes is color-coded with at least one of a plurality of distinctive colors, and each of the distinctive colors corresponds to a characteristic of sound production associated with at least one phoneme of at least one of the graphemes. In addition, each of a plurality of visually perceivable images is positioned adjacent to at least one of the graphemes, such that the adjacent image has a name including at least one phoneme of the at least one adjacent grapheme. Each of a plurality of individually-activated, sound generating devices also is associated with at least one of the graphemes and generates the name or at least one phoneme of the at least one grapheme, and at least one sound pattern generating device for generating patterns of sounds comprising more than one of the names or phonemes generated by the plurality of sound generating devices. It further may comprise the step of forming words, phrases, and sentences phonetically with a set of reinforcing objects, such as cards, blocks, or dice depicting graphemes. Each of these objects depicts at least one of the graphemes from the display and may include the image positioned adjacent to that grapheme. Further, each object is color-coded with the distinctive color used to color-code the grapheme on the display.

With regard to the apparatus and the method described above, the colors may further comprise a first color corresponding to the graphemes characterized by vowel sound production, a second color corresponding to the letters characterized by voiced sound production, a third color corresponding to the graphemes characterized by unvoiced sound production, a fourth color corresponding to the letters characterized by nasal sound production, and a fifth color corresponding to the graphemes characterized by a mixture of characteristics of sound production. Nevertheless, the number of colors utilized will depend on the language taught and the number of distinctive features associated with the graphemes of that language and chosen for depiction on the displays or reinforcing objects.

Other objects, advantages, and features will be apparent when the description of preferred embodiments and the drawings are considered.

BRIEF DESCRIPTION OF THE DRAWINGS

FIG. 6 indicates the color represented by the hatching appearing in FIGS. 1, 3, and 5A–I.

DESCRIPTION OF PREFERRED
EMBODIMENTS "The Names of the Letters"

Figure 1:
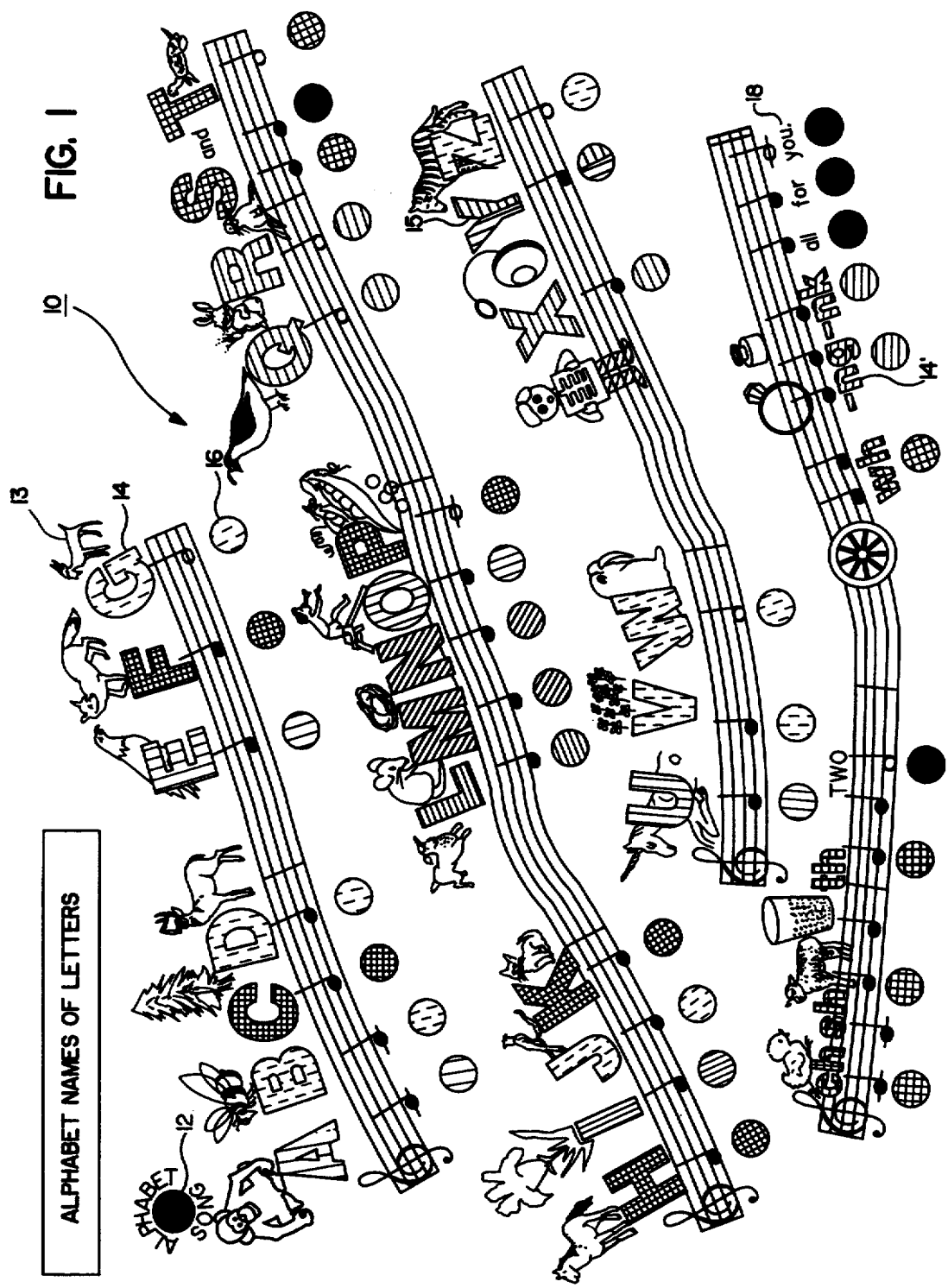
FIG. 1 depicts a display of graphemes according to the present invention for teaching the names of graphemes in English.

Referring to FIG. 1, a display of graphemes 10 is depicted on the surface of a board manufactured from a light, rigid material, such as plastic, plastic by-products, reinforced cardboard, or the like. In this embodiment of the invention, a sound pattern generating device 12, such as a pressure-activated audio chip, is located in one corner of board. For example, sound pattern generating device 12 may be placed in the upper left-hand corner of the board, so that it will not interfere with the depiction of letters on display 10. Sound pattern generating device 12 may include a speaker and sound generating electronics. Further, it may operate independently or may share components, such as a speaker, voice recorder, or voice synthesizer, with other elements of the present invention. Suitable electronic devices for generating phonemes, e.g., speech sounds, are known in the art, and examples of such devices are disclosed in U.S. Pat. Nos. 5,220,531 to Blyth et al. and 4,970,659 to Breedlove et al., which are incorporated herein by reference. Voice recorder chips, such as the CMOS IDS1100 produced by Information Storage Devices, which are capable of storing multiple-voltage levels into previously binary, two-level EEPROM cells, would also be suitable.

Although sound pattern generating device 12 is preferably pressure activated, it may be activated by other means such as by light or heat. "Light" includes electromagnetic waves in the visible and invisible, e.g., ultraviolet and infrared, frequency ranges. Light-activated, generating devices might be helpful to users possessing physical impairments, such as paraplegics, or those suffering from physically debilitating diseases.

Figure 2:
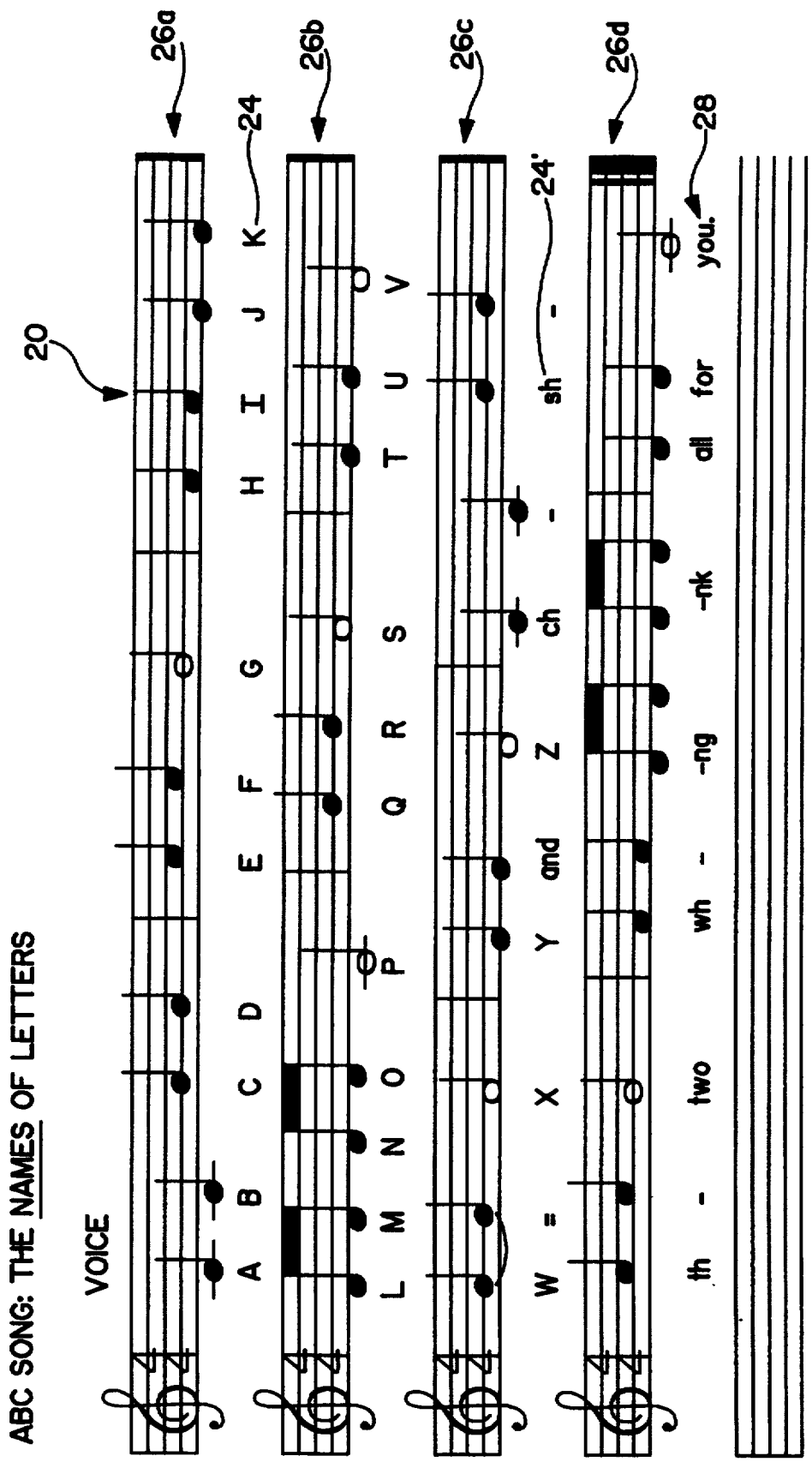
FIG. 2 depicts the musical notes and grapheme names describing a sound pattern for teaching the names of graphemes in English in the embodiment of FIG. 1.

Referring to FIGS. 1 and 2, activating sound pattern generating device 12 generates a sound pattern 20 containing the names of the graphemes of an alphabet 24 and 24'. For example, pattern 20 may be the familiar "Alphabet Song" or a variation thereof. In a preferred embodiment, pattern 20 may include the names of the twenty-six single letters or graphemes 24 of the English language alphabet and certain additional graphemes 24', e.g., CH, TH, WH, -NG, and -NK, which represent phonemes that are important to learning to read, write (spell), and speak the English language. Such digraphs, i.e., combinations of alphabet symbols which represent a single speech sound, are also presented as part of display of graphemes 10. Referring to FIG. 2, a preferred sound pattern 20 is represented as a combination of grapheme names 24 and 24' and words 28 set to music 26a-d.

An image 13, e.g., a black-and-white or colored drawing or photograph, is associated with and adjacent to each of graphemes 14 and 14'. When possible, images 13 are chosen to provide a clue as to the name of the associated grapheme 14 or 14' and contain a phoneme of grapheme 14 or 14'. For example, an Ape may be depicted for A, a Bee may be depicted for B, a Cedar may be depicted for C.

An individually activated, sound generating device 16, e.g., an electronic, pressure sensitive, voice synthesizing or record/playback chip or pressure-sensitive audio chip, is associated with each grapheme 14 or 14' in display 10. Although sound generating devices 16 are individually activated, they may share components, such as a speaker, voice recorder, or voice synthesizer with sound pattern generating device 12 or with each other. When activated by a user, sound generating device 16 generates the name of the associated grapheme 24 and 24'. Moreover, the user may activate sound generating devices 16 to "sing" along with the sound pattern 20 or may sing the alphabet song and accompany himself or herself by activating sound generating devices 16 according to the pattern established by sound pattern generating device 12. By activating sound generating devices 16, the user receives immediate confirmation or feedback concerning the names corresponding to graphemes 14 and 14'. By this process, the user associates printed grapheme 14 or 14' with the name of the grapheme as generated, e.g., sung or spoken, by sound pattern generating device 12 and sound generating device 16 and with a phoneme contained in the name of an image 13 adjacent to that grapheme. Further, because the order of grapheme names 24 and 24' in sound pattern 20 is reproduced by grapheme 14 and 14' on display 10, even young children or the learning impaired can quickly learn to follow sound pattern 20 and activate sound generating devices 16 on display 10.

In this embodiment, graphemes 14 and 14' are color-coded according to a characteristic of their sound production. Referring to FIG. 1, words 28 are preferably depicted in black, so that they may not be confused with color-coded graphemes 14 and 14'. Graphemes 14 and 14' are generally divided into two categories:

(1) Vowels, i.e., A, E, I, 0, and U and sometimes Y, which are speech sounds that are produced by the relatively unimpeded passage of breath through the mouth and which vary in quality according to the size, shape, and condition of the resonance cavity, and (2) Consonants, e.g., B, C, D, F, etc., which are produced by the contact or constriction of the speech organs, such as the lips, teeth, and mouth, resulting in deflection or partial blockage of the passage of breath.

Although the colors may be varied, vowels preferably appear in red, and consonants appear in other colors and are grouped depending on the manner in which their speech sounds are produced, i.e., their characteristics of sound production. Consonants may be described and differentiated by (1) their place of articulation, e.g., bilabial (two lips, e.g., b) or alveolar (behind the teeth, e.g., t); (2) their vibration of or failure to vibrate the vocal chords, i.e., voiced or unvoiced; (3) the presence or absence of nasality; and (4) the manner of production, e.g., continuant, such as h, or fricative, such as z. Thus, consonants are preferably color-coded as follows: unvoiced—yellow, voiced—pink, nasal green, and mixed—blue. Further, digraphs having vowel, unvoiced, voiced, nasal, or mixed sounds are color-coded accordingly. FIG. 6 indicates the hatching representing various colors of the color code used in FIG. 1.

Table I illustrates a color-coding scheme for differentiating graphemes 14 and 14' based on their division into vowels and unvoiced, voiced, nasal, and mixed sound consonants.

TABLE I

| Characteristic of Sound Production | Color | Graphemes |
| --- | --- | --- |
| Vowel | Red | A, E, I, O, U, and Y |
| Voiced | Pink | B, D, G, J, TH, V, W, and Z |
| Unvoiced | Yellow | CH, F, H, K, P, S, SH, T, TH, and WH |
| Nasal | Green | M, N, -NG, and -NK |
| Mixed | Blue | L, Q, R, X and Y |

The letter Y, however, is described in Table I as a vowel and as a mixed sound consonant. This dual identity is depicted in FIG. 1 by color-coding one half of grapheme Y 15 in blue and the other half in red.

Color-coding provides additional consistency of presentation between the embodiments of the invention, described herein. It also helps reinforce the connection between the graphemes and grapheme names and phonemes. Moreover, it teaches basic similarities in the characteristics of sound production. "The Sound of Letters"

Figure 3:
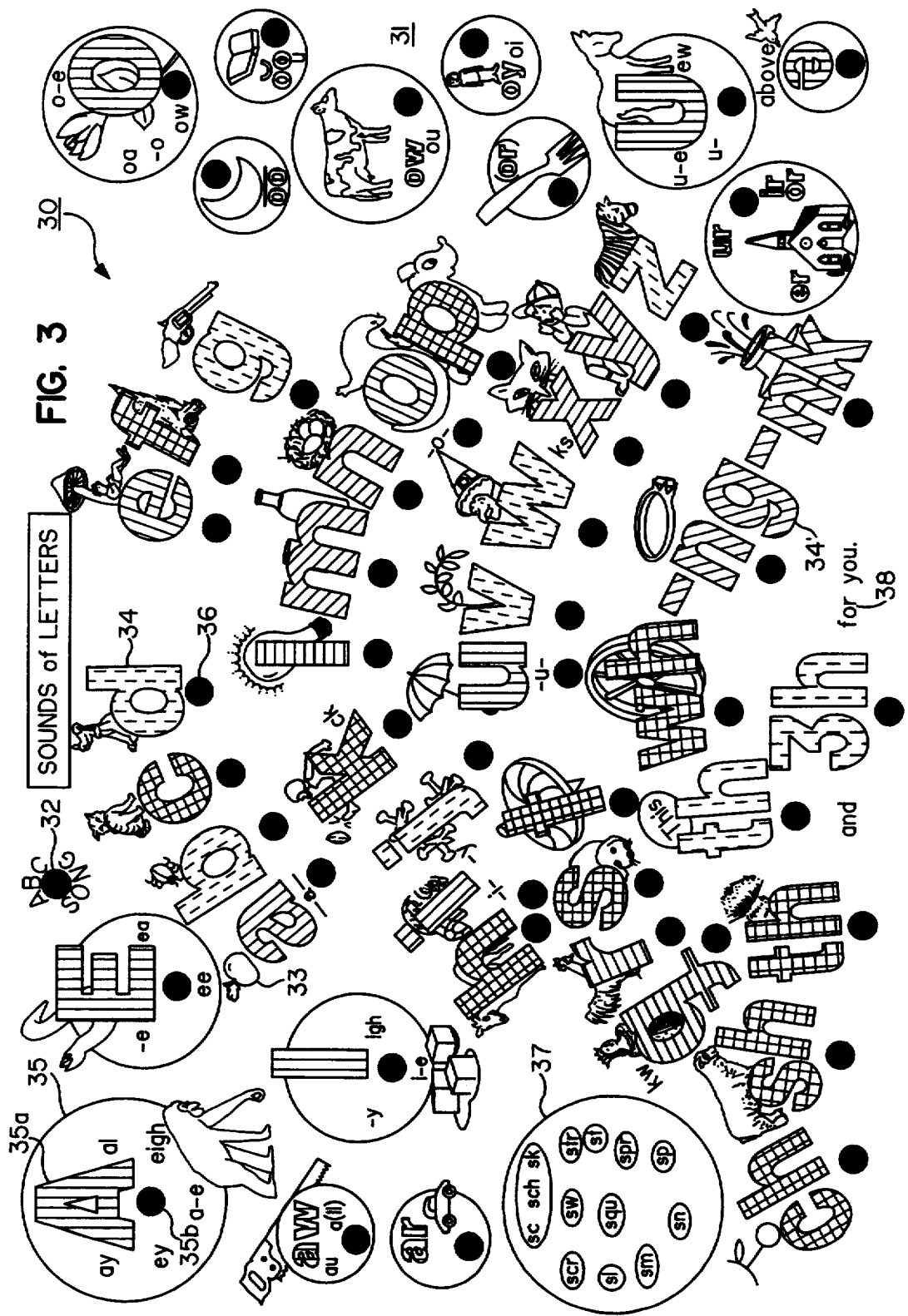
FIG. 3 depicts a display of graphemes according to the present invention for teaching the sounds of graphemes in English.

Referring to FIG. 3, a display of graphemes 30 is depicted on the surface of a board 31 manufactured from a light, rigid material, such as plastic, plastic by-products, reinforced cardboard, or the like. In this embodiment of the invention, a sound pattern generating device 32, such as a pressure-activated audio chip, is located on board 31, so that it does not interfere with the depiction of graphemes on display 30. For example, sound pattern generating device 32 may be placed in the left-hand portion of the upper edge of board 31. Sound pattern generating device 32 may include a speaker and sound generating electronics. Further, it may operate independently or may share components, such as a speaker, voice recorder, or voice synthesizer, with other elements of the present invention. It may be similar in design to sound pattern generating device 12, described above.

Figure 4:
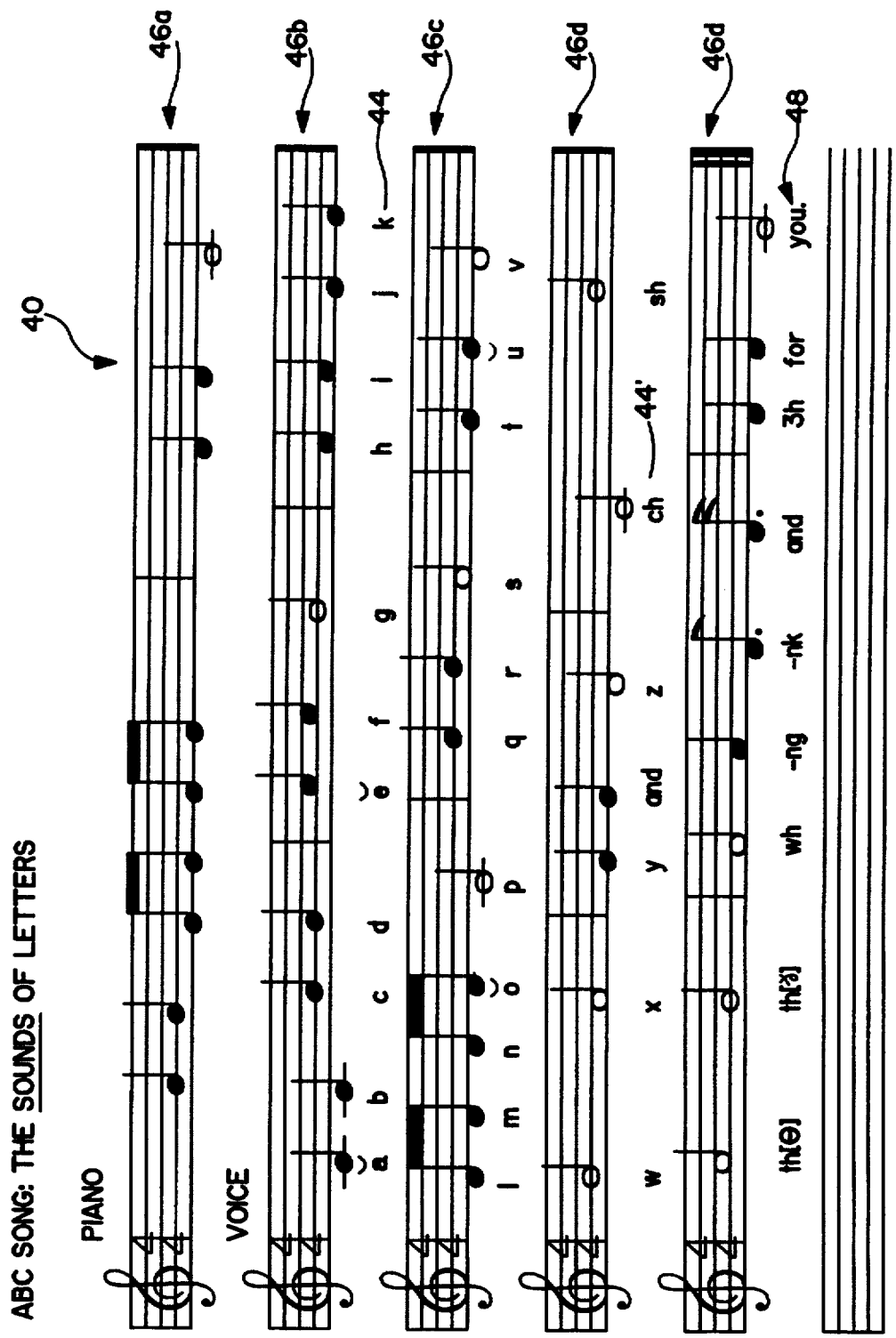
FIG. 4 depicts the musical notes and grapheme phonemes describing a sound pattern for teaching the speech sounds of the graphemes in English in the embodiment of FIG. 3.
Figure 5A:
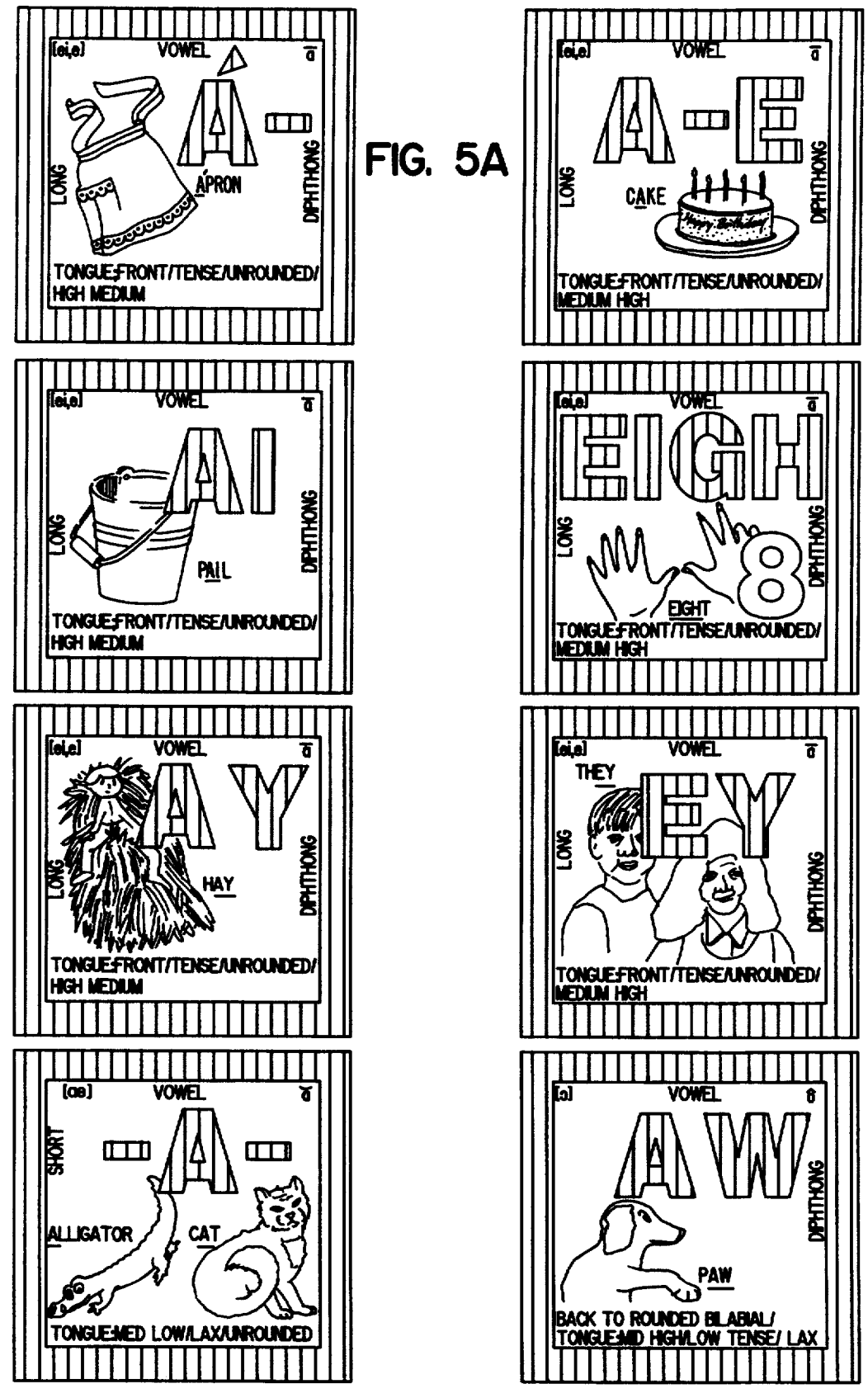
FIGS. 5A–I depict a set of color-coded cards according to the present invention for use with the displays of letters of FIGS. 1 and 3 in a method for teaching English.
Figure 5E:
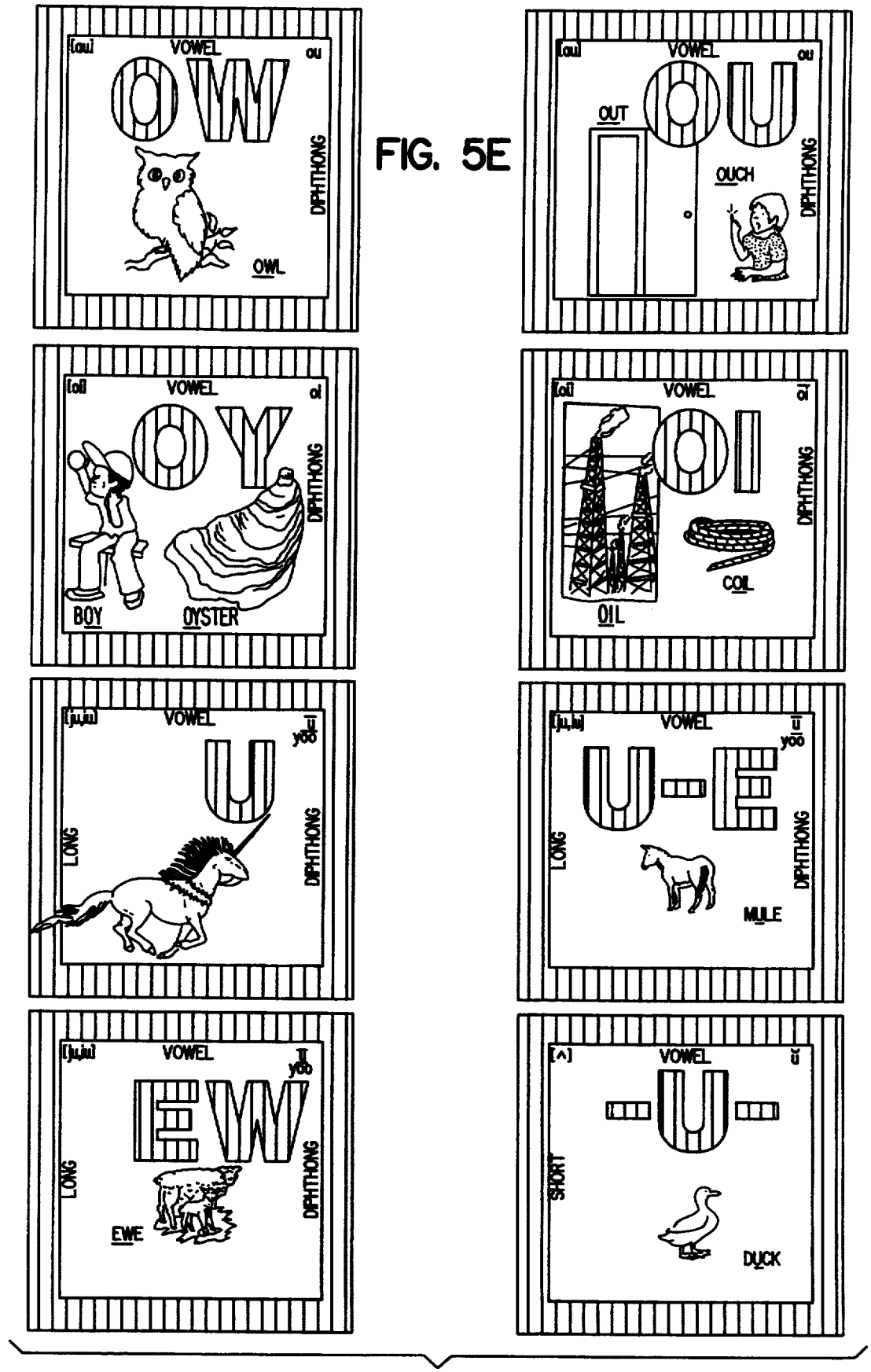
Figure 5G:
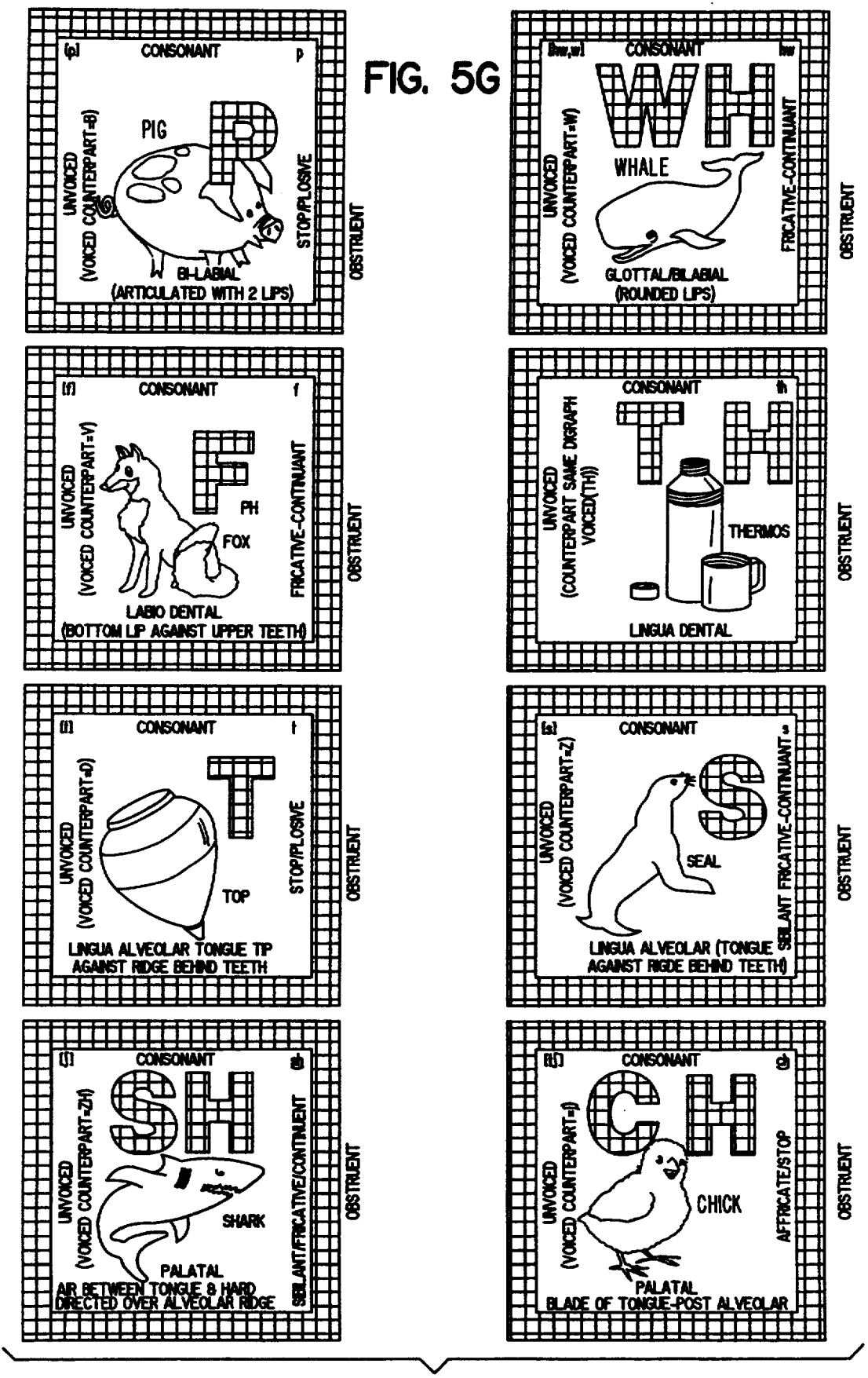

Activating sound pattern generating device 32, e.g., the "ABC Song" button on FIG. 3, generates a sound pattern 40, depicted on FIG. 4, with letter phonemes 44 and 44' corresponding to the graphemes 34 and 34' represented on display 30. Although sound pattern generating device 32 is preferably pressure activated, it may be activated by other means such as by light or heat. In one preferred embodiment sound pattern 40 may be a variation on the familiar "Alphabet Song." Referring to FIG. 4, sound pattern generating device 32 may generate sound pattern 40 similar to the pattern generated by sound pattern generating device 12 depicted in FIGS. 1 and 2. Preferred sound pattern 40 is represented as a combination of grapheme phonemes 44 and 44' and words 48 set to music 46a–e. However, on board 31, grapheme names 22 and 22' of graphemes 14 and 14' are replaced with the grapheme phonemes 44 and 44' of graphemes 34 and 34'.

In this embodiment, graphemes 34 and 34' are printed in lower case type, and most of the phonemes of graphemes 34 and 34' on display 30 are included in sound pattern 40. Preferably, vowels sounds included in sound pattern 40 are short. An image 33, e.g., a black-and-white or colored drawing or photograph, is associated with and adjacent to each of graphemes 34 and 34', and images 33 are chosen to contain a phoneme of grapheme 34 or 34', e.g., an apple is depicted for a and an elf is depicted for e. Long vowel sounds which are identical to the names of the vowels are not included in sound pattern 40. Nevertheless, the embodiment also presents the long sounds of the vowels and teaches the digraphs which can produce these sounds.

An individually activated, sound generating device 36, e.g., an electronic, pressure sensitive, voice synthesizing or record/playback chip or pressure sensitive audio chip, is associated with each grapheme 34 or 34' in display 30. Although sound generating devices 36 are individually activated, they may share components, such as a speaker, voice recorder, or voice synthesizer, with sound pattern generating device 32 or with each other. When activated by a user, sound generating devices 36 generate a phoneme of associated letter 44 and 44'. Moreover, the user may activate sound generating devices 36 to "sing" along with sound pattern 40 or may generate grapheme phonemes 44 and 44' of graphemes 34 and 36 and accompany himself or herself by activating sound generating devices 38 according to the pattern established by sound pattern generating device 32. By this process, the user associates printed grapheme 34 or 34' with grapheme phoneme 44 or 44' as generated, e.g., sung or spoken, by sound generating device 32 and sound generating device 38 and with a phoneme contained in the name of image 33 adjacent to that grapheme. Moreover, because the order of grapheme phonemes 44 and 44' in sound pattern 40 is reproduced in display 30, even young children or the learning impaired may quickly learn to follow sound pattern 40 on display 30. Again, by activating sound generating devices 36, the user receives immediate confirmation or feedback concerning phonemes corresponding to grapheme 34 and 34'. Moreover, by using sound generating devices 36 in combination, the user may sound out words, phrases, and sentences and mute or speech-impaired users may communicate using the board to generate words, phrases, or sentences.

Digraphs representing the long vowel sounds and some short vowel sounds are arranged within circles 35 located along the edges of board 31. The long vowel sounds are represented by a grapheme 35a appearing in upper case type. Each circle 35 represents a single phoneme and also contains a sound generating device 35b for generating that phoneme. Circles 35 associated with long vowel sounds may be arranged near the representations of other related vowel sounds and diphthongs, i.e., compound vowel sounds produced by combining two simple vowel sounds, such as oi in point, that begin with the same grapheme. This arrangement promotes more precise and faster recall of the phonemes. Further, circles 35 may be color-coded in accordance with the single characteristic of sound production attributed to the grapheme 35a.

As discussed above, in this embodiment of the apparatus, graphemes 34 and 34' are color-coded according to a characteristic of their sound production. Referring to FIGS. 3 and 4, words 44 are preferably depicted in black, so that they are not confused with color-coded graphemes 34 and 34'. Table II illustrates a color-coding scheme for differentiating graphemes 34 and 34' based on their division into vowels and unvoiced, voiced, nasal, and mixed sounds. FIG. 6 again indicates the hatching representing various colors of the color code used in FIG. 3.

TABLE II

| Characteristics of Sound Production | Color | Graphemes |
|---|---|---|
| Vowel | Red | A, a, ae, a-e, ai, a(ll), a(r), au, aw, ay, E, e, -e, ea, ee, ei, eigh, er, ew, ey, I, i, i-e, igh, ir, O, o, -o, o-e, oi, oo, oo, or, o(r), ou, ough, ow, oy, U, u, u-, ur, u-e, y, AND -y |
| Voiced | Pink | b, d, g, j, th, v, w, z, AND ξh |
| Unvoiced | Yellow | ch, f, h, k, p, s, sh, t, th, AND wh |
| Nasal | Green | m, n, -ng, AND -nk |
| Mixed | Blue | l, q, r, x, AND y |

The grapheme y is described in Table II as a vowel and as a mixed sound consonant. Despite this dual identity, y is depicted in FIG. 3 as a mixed sound consonant, i.e., by color-coding y in blue.

Color-coding provides additional consistency of presentation between the embodiments of the invention, described herein. It also helps reinforce the connection between the alphabet and combinations of graphemes and the phonemes of graphemes 34 and 34'. Moreover, it teaches basic similarities in the characteristics of sound production.

Although Tables I and II divide letters into five color-coded groups, graphemes may be assigned to groups based on numerous characteristics of sound production. Table III identifies some of the other significant characteristics of sound production which may be used to distinguish between letters in the English language. Of course, the number and nature of the characteristics of sound production will vary between languages.

TABLE III

| Graphemes | Vibration of Vocal Chords | Type | Manner of Production | Place of Articulation |
|---|---|---|---|---|
| -a- | Short | Vowel | — | Medium Low/ Lax/ Front/ Un-rounded |
| á- | Long | Vowel | Diphthong (First Syllable) | High Medium/ Tense/ Front/ Un-rounded |
| a(ll) | — | Vowel | Diphthong | High Medium/ Low Tense-Lax/ Back/ Rounded |
| a(r) | — | Vowel | — | Low/Lax Back/ Un-rounded |
| ai | Long | Vowel | Diphthong | High Medium/ Tense/ Front/ Un-rounded |
| au | — | Vowel | Diphthong | High Medium/ Low Tense - Lax/ Back/ Rounded |
| aw | — | Vowel | Diphthong | High Medium/ Low Tense-Lax/ Back/ Rounded |
| ay | Long | Vowel | Diphthong | High Medium/ Tense/ Front/ Un-rounded |
| a-e | Long | Vowel | Diphthong | High Medium/ Tense/ Front/ Un-rounded |
| b | Voiced | Consonant | Stop/Plosive | Bilabial |
| d | Voiced | Consonant | Stop/Plosive | Lingua-Alveolar |
| -e | Long | Vowel | — | High/ Tense/ Front/ Un-rounded |
| -e- | Short | Vowel | — | Medium High/ Lax/ Front/ Un-rounded |
| é- | Long | Vowel | Diphthong (First Syllable) | High/ Tense/ Front/ Un-rounded |
| ea | Long | Vowel | — | High/ Tense/ Front/ Un-rounded |
| ea | Short | Vowel | — | High/ Tense/ Front/ Un-rounded |
| ee | Long | Vowel | — | High/ Tense/ Front/ Un-rounded |
| eigh | Long | Vowel | Diphthong | High Medium/ Tense/ Front/ Un-rounded |
| er | — | Vowel | — | — |
| ew | Long | Vowel | Diphthong | — |
| ey | Long | Vowel | Diphthong | High Medium/ Tense/ Front/ Un-rounded |
| g | Voiced | Consonant | Stop/Plosive | Velar |
| h | Unvoiced | Consonant | Aspirate/ Fricative/ Continuant | Glottal |
| i | Long | Vowel | Diphthong | — |
| -i- | Short | Vowel | — | High/ Lax/ Front/ Un-rounded |
| í- | Long | Vowel | Diphthong (First Syllable) | — |
| -igh | Long | Vowel | Diphthong | — |
| ir | — | Vowel | — | — |
| i-e | Long | Vowel | Diphthong | — |
| j | Voiced | Consonant (Diphthongal) | Fricative/ Affricate/ Stop/ Plosive | Palatal |
| k | Unvoiced | Consonant | Stop/Plosive | Velar |
| l | Voiced/ Lateral | Consonant (Semi-Vowel/ Liquid) | Continuant | Lingua-Alveolar |
| m | Voiced | Consonant | Continuant | Bilabial/ Nasal |
| n | Voiced | Consonant (Sometimes Liquid) | Continuant | Lingual/ Velar/ Nasal |
| -ng | Voiced | Consonant/ Liquid | Continuant | Velar/ Nasal |
| -nk | Voiced | Conso- | Continuant/ | Velar/ |

TABLE III-continued

| Graphemes | Vibration of Vocal Chords | Type | Manner of Production | Place of Articulation |
|---|---|---|---|---|
| | | nant | Plosive | Nasal |
| o | Long | Vowel | Diphthong | — |
| -o | Long | Vowel | Diphthong | — |
| -o- | Short | Vowel | — | Medium Low/ Lax/ Back |
| á- | Long | Vowel | Diphthong (First Syllable) | — |
| oa | Long | Vowel | Diphthong | — |
| o-e | Long | Vowel | Diphthong | Medium High/ Tense/ Back/ Rounded |
| oi | — | Vowel | Diphthong | — |
| oo | Long | Vowel | — | High/ Tense/ Back/ Rounded |
| o͝o | Short | Vowel | — | High/ Lax/ Back |
| or | — | Vowel | — | — |
| ou | — | Vowel | Diphthong | — |
| ow | Long | Vowel | Diphthong | — |
| ow | — | Vowel | Diphthong | — |
| oy | — | Vowel | Diphthong | — |
| q | Unvoiced K Plus Voiced W | Consonant/ Mixed | Plosive | Velar/ Bilabial |
| th | Voiced | Consonant | Fricative/ Continuant | Lingua-Dental |
| u | Short | Vowel | — | — |
| u- | Long | Vowel | Diphthong | — |
| á- | Long | Vowel | Diphthong (First Syllable) | — |
| u-e | Long | Vowel | Diphthong | — |
| ur | — | Vowel | — | — |
| v | Voiced | Consonant | Fricative/ Continuant | Labio-Dental |
| w | Voiced | Consonant/ Semi-Vowel | Fricative/ Continuant | Bilabial/ Velar |
| x | Unvoiced | Consonant | Fricative/ Sibilant | Velar/ Lingua-Alveolar |
| y | Voiced | Consonant (Semi-Vowel) | Glide/ Slightly Fricative/ Continuant | Front-Palatal |
| -y | Long | Vowel | Diphthong | — |
| -y | Short | Vowel | — | — |
| z | Voiced | Consonant | Sibilant/ Fricative/ Continuant | Lingua-Alveolar |
| ȝh | Voiced | Consonant | Sibilant/ Fricative/ Continuous | Post Ridge (Palatal) |

Method of Teaching

The interactive teaching apparatus described above are preferably used as part of a program, system, or course of study designed to teach or improve reading, writing (and spelling), and speech skills. The apparatus are preferably used together in such a program. A person may utilize a display of graphemes, such as display 10 depicted in FIG. 1, in order to learn the names of the graphemes of an alphabet, e.g., the English alphabet. Referring to FIG. 1, a person activates sound pattern generating device 12 and thereby, causes a sound pattern containing the names of the graphemes of the alphabet to be generated. At first, the person may simply listen to the graphemes names, attempt to sing along with the pattern or repeat the names generated by sound pattern generating device 12.

Preferably, graphemes 14 and 14' are depicted on display 10 in the same order in which they are generated by sound pattern generating device 12. This greatly simplifies the user's task in associating grapheme names generated by each sound generating device 16 and grapheme names 24 and 24' generated in pattern 20 by sound pattern generating device 12. The person using display 10 to learn the names of graphemes of an alphabet may activate sound pattern generating device 12 and then sequentially activate sound generating devices 18 to sing along with sound pattern 20. This process should be repeated until the names of the graphemes can be activated according to the sound pattern without error.

It is further preferred that sound pattern 20 is generated at a sufficiently slow speed to permit the user to locate grapheme 14 and 14', recognize each grapheme and color, and identify image 13 associated with each grapheme. This apparatus is not intended to provide a test of manual dexterity, but rather to teach the names of the graphemes of an alphabet and identify characteristics of the production of the sound of each grapheme and at least one phoneme associated with each grapheme and contained in the name of the adjacent image.

After the pupil has mastered, i.e., can repeat without error, the names of the graphemes, the pupil may utilize display 30 to learn phonemes 44 and 44' associated with graphemes 34 and 34'. See FIGS. 3 and 4. As described above, sound pattern generating device 32 generates sound pattern 40 which contains the phonemes of an alphabet, e,g., the English language alphabet. Referring to FIG. 3, a user may begin by simply listening or pointing to the phonemes generated by sound pattern generating device 32, or both, or may attempt to sing along with the pattern repeating the phonemes.

Again, it is preferred that graphemes 34 and 34' are depicted on display 30 in the same order in which their associated phonemes are generated in sound pattern 40. See FIG. 4. This greatly simplifies the process of associating a grapheme with a phoneme. Eventually, the person using display 30 to learn the phonemes of the graphemes of the alphabet may activate sound pattern generating device 32 and then sequentially activate sound generating devices 36 to sing along with sound pattern 40. This process should be repeated until the phonemes of the graphemes can be activated according to the sound pattern without error.

Figure 7:
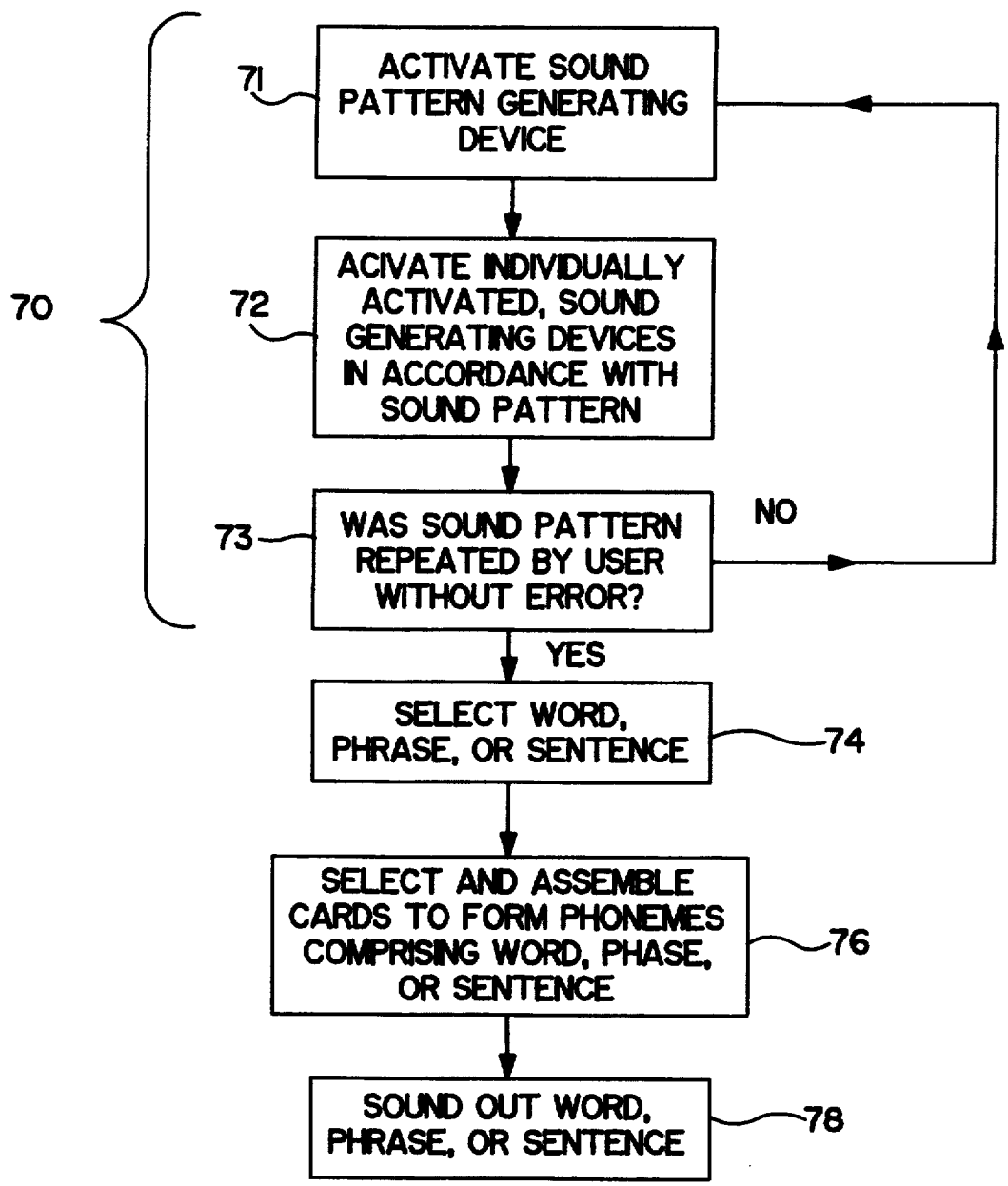
FIG. 7 is a flow chart depicting an embodiment of interactive teaching method of the present invention.
Figure 4:
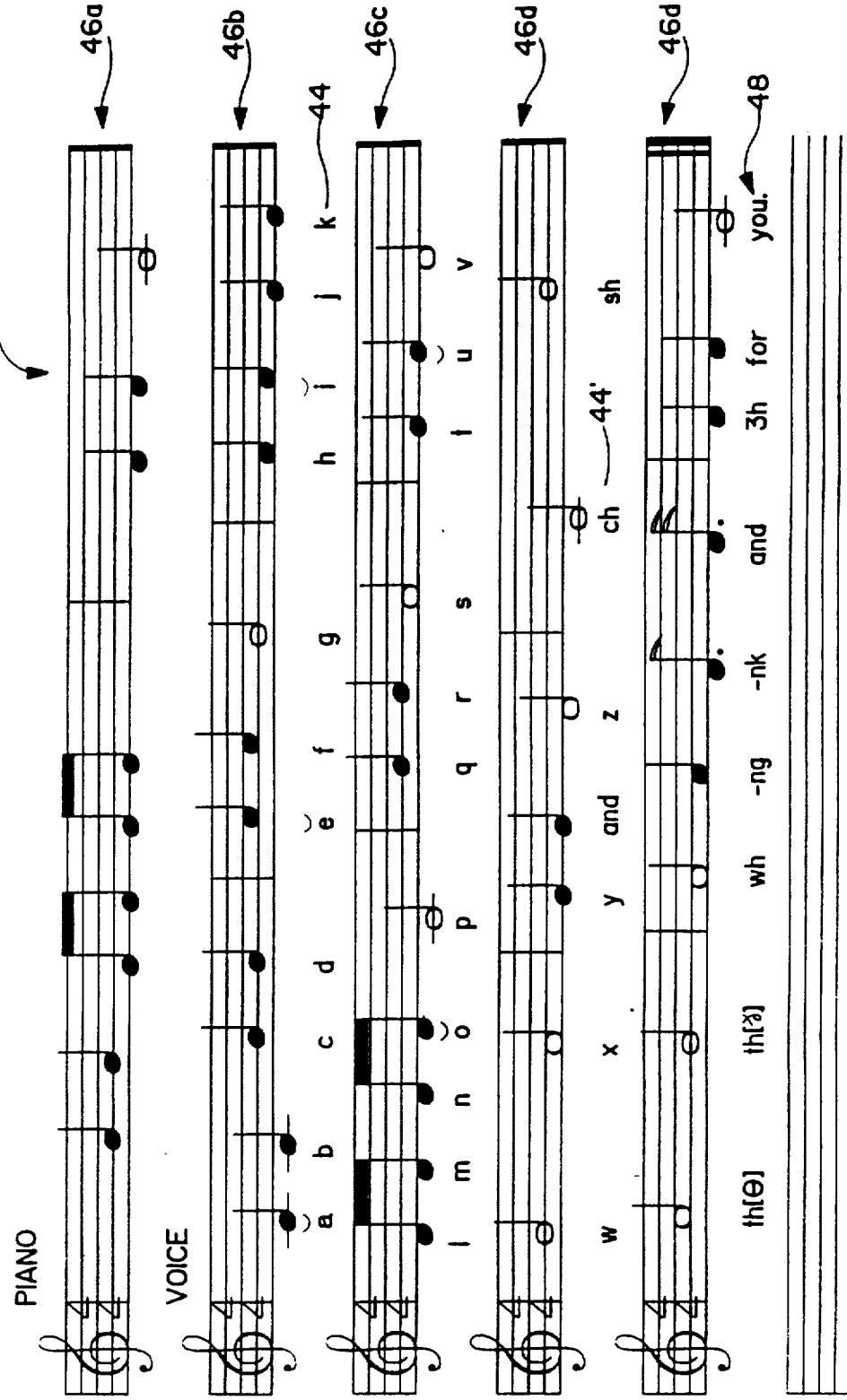
Figure 5G:
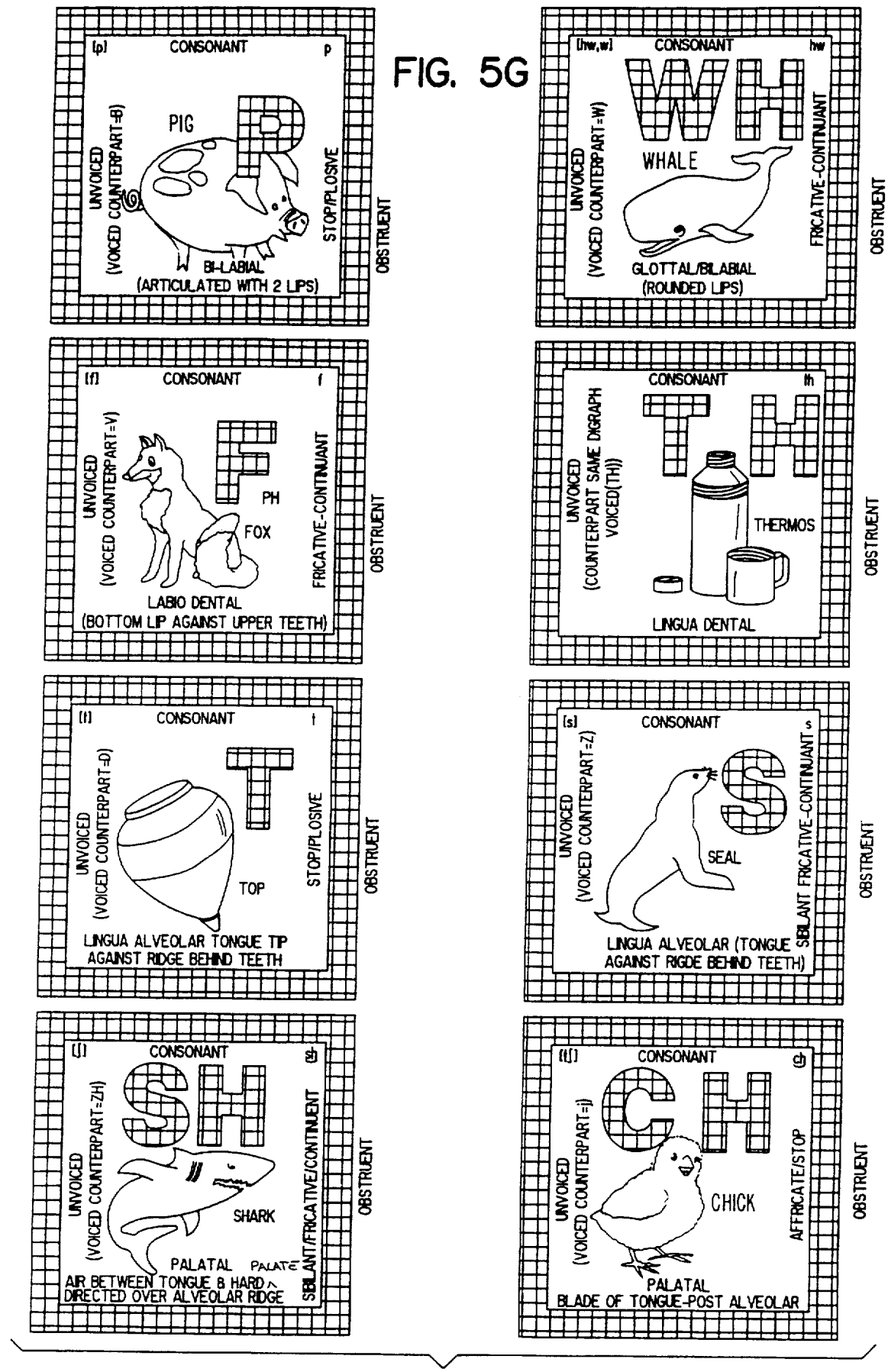
Figure 5:
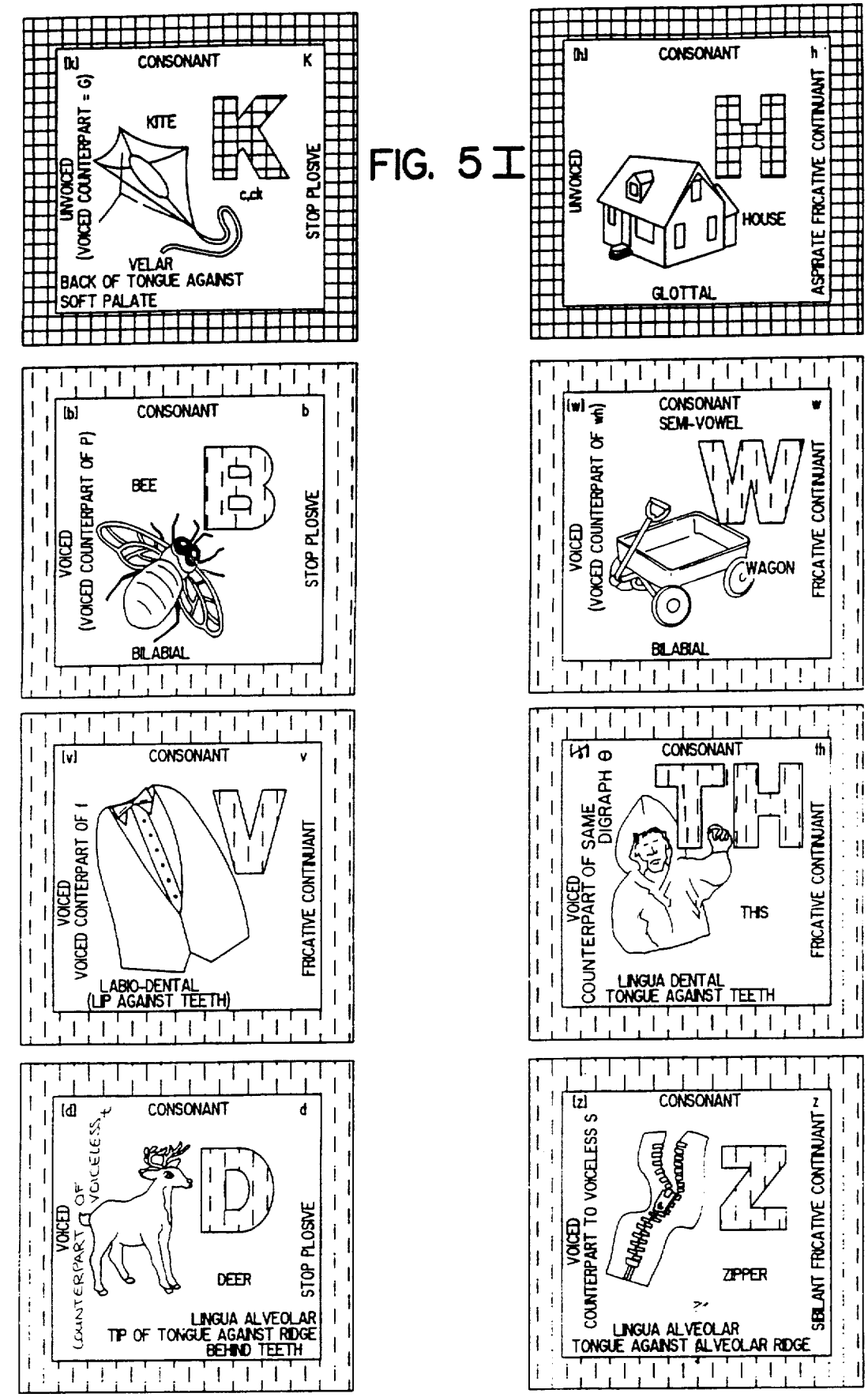

Referring to FIG. 7, an embodiment of the interactive teaching method is depicted as comprising the following steps: first, activate sound pattern generating device, step 71; second, activate individually activated sound generating devices in accordance with the sound pattern, step 72; and third, repeat steps 71 and 72 if the sound pattern was not repeated without error until it is repeated without error, step 73. These first three steps may be collectively referred to as step 70. Step 70 applies equally to the utilization of display 10 to learn the names of the graphemes used to spell words and the utilization of display 30 to learn the phonemes associated with the graphemes used to pronounce words. Step 70 may itself be repeated as necessary to teach the relationships between the graphemes and the phonemes associated with the graphemes. Moreover, although it is preferred that the grapheme names are learned before the phonemes associated with those graphemes, displays 10 and 30 may be used in any order.

In step 74, the user selects a word, phrase, or sentence to write. Using a reinforcing object, such as the laminated cards depicted in FIGS. 5A-I, the user may select and assemble the cards to match the graphemes comprising the word, phrase, or sentence according to step 76. By comparing the phonemes represented by the cards to the sound of the word, phrase, or sentence, the spelling of the word or words may be determined, step 78. Alternatively, the user may select a word, phrase, or sentence to read in step 74. The user may assemble the cards corresponding to the graphemes of the word, phrase, or sentence, step 76. According to step 78, the user may then sound out, i.e., read, the word, phrase, or sentence.

Although a detailed description of the present invention is provided above, it is to be understood that the scope of the invention is not to be limited thereby, but is to be determined by the claims that follow.

I claim:

1. An interactive teaching apparatus for teaching graphemes, grapheme names, phonemes, and phonetics comprising:
   a display of graphemes wherein each of said graphemes is color-coded with at least one of a plurality of distinctive colors and each of said distinctive colors corresponds to a characteristic of sound production associated with at least one phoneme of at least one of said graphemes;
   a plurality of visually perceivable images, each of which is positioned adjacent to at least one of said graphemes, such that said adjacent image has a name including at least one phoneme of said at least one adjacent grapheme;
   a plurality of individually-activated, sound generating devices, each of which is associated with one of said graphemes and generates the name of said grapheme; and
   at least one sound pattern generating device for generating patterns of sounds comprising more than one of the names generated by said plurality of sound generating devices.

2. The teaching apparatus of claim 1 wherein said individually-activated, sound generating device is activated by pressure.

3. The teaching apparatus of claim 1 wherein said individually-activated, sound generating device is activated by light.

4. The teaching apparatus of claim 1 wherein said colors comprise a first color corresponding to said graphemes characterized by vowel sound production.

5. The teaching apparatus of claim 4 wherein said colors further comprise a second color corresponding to said graphemes characterized by voiced sound production, a third color corresponding to said graphemes characterized by unvoiced sound production, a fourth color corresponding to said graphemes characterized by nasal sound production, and a fifth color corresponding to said graphemes characterized by a mixture of characteristics of sound production.

6. The teaching apparatus of claim 5 wherein said first color is red, said second color is pink, said third color is yellow, said fourth color is green, and said fifth color is blue.

7. The teaching apparatus of claim 1 wherein said graphemes characterized by vowel sound production comprise A, E, I, O, U, and Y; said graphemes characterized by voiced sound production comprise B, D, G, J, TH, V, W, ZH and Z; said graphemes characterized by unvoiced sound production comprise CH, F, H, K, P, S, SH, T, TH, and WH; said graphemes characterized by nasal sound production comprise M, N, -NG, and -NK; and said graphemes characterized by a mixture of characteristics of sound production comprise L, Q, R, X, and Y.

8. An interactive teaching apparatus for teaching graphemes, grapheme names, phonemes, and phonetics comprising:
   a display of graphemes wherein each of said graphemes is color-coded with at least one of a plurality of distinctive colors and each of said distinctive colors corresponds to a characteristic of sound production associated with at least one phoneme of at least one of said graphemes;
   a plurality of visually perceivable images, each of which is positioned adjacent to at least one of said graphemes, such that said adjacent image has a name including at least one phoneme of said at least one adjacent grapheme;
   a plurality of individually-activated, sound generating devices, each of which is associated with at least one of said graphemes and generates at least one phoneme of said at least one grapheme; and
   at least one sound pattern generating device for generating patterns of sounds comprising more than one of the phonemes generated by said plurality of sound generating devices.

9. The teaching apparatus of claim 8 wherein said display of graphemes is arranged, such that each of said sound generating devices is encircled by graphemes associated with at least one phoneme generated by said sound generating device.

10. The teaching apparatus of claim 9 wherein said individually-activated, sound generating device is activated by pressure.

11. The teaching apparatus of claim 9 wherein said individually-activated, sound generating device is activated by light.

12. The teaching apparatus of claim 9 wherein said colors comprise a first color corresponding to said graphemes characterized by vowel sound production.

13. The teaching apparatus of claim 12 wherein said colors further comprise a second color corresponding to said graphemes characterized by voiced sound production, a third color corresponding to said graphemes characterized by unvoiced sound production, a fourth color corresponding to said graphemes characterized by nasal sound production, and a fifth color corresponding to said graphemes characterized by a mixture of characteristics of sound production.

14. The teaching apparatus of claim 13 wherein said first color is red, said second color is pink, said third color is yellow, said fourth color is green, and said fifth color is blue.

15. The teaching apparatus of claim 8 wherein said graphemes characterized by vowel sound production comprise ā, a, ae, a-e, ai, a(ll), a(r), au, aw, ay, ē, e, ĕ, -e, ea, ee, ei, eigh, er, ew, ey, ī, i, i-e, igh, ir, ō, o, -o, o-e, oi, oo, ōō, or, o(r), ou, ough, ow, oy, ū, u, u-, ur, u-e, y, and -y; said graphemes characterized by voiced sound production comprise b, d, g, j, th, v, w, z, and ₃h; said graphemes characterized by unvoiced sound production comprise ch, f, h, k, p, s, sh, t, th, and wh; said graphemes characterized by nasal sound production comprise m, n, -ng, and -nk; and said graphemes characterized by a mixture of characteristics of sound production comprise l, q, r, x, and y.

16. An interactive teaching method for teaching graphemes, grapheme names, phonemes, and phonetics comprises the steps of:

utilizing a display of graphemes wherein each of said graphemes is color-coded with at least one of a plurality of distinctive colors and each of said distinctive colors corresponds to a characteristic of sound production associated with at least one phoneme of at least one of said graphemes; each of a plurality of visually perceivable images is positioned adjacent to at least one of said graphemes, such that said adjacent image has a name including at least one phoneme of said at least one adjacent grapheme; each of a plurality of individually-activated, sound generating device is associated with at least one of said graphemes and generates the name of said at least one grapheme; and at least one sound pattern generating device for generating patterns of sounds comprising more than one of the names generated by said plurality of sound generating devices to learn the names of the graphemes used to form words and utilizing a display of graphemes wherein each of said graphemes is color-coded with at least one of a plurality of distinctive colors and each of said distinctive colors corresponds to a characteristic of sound production associated with at least one phoneme of at least one of said graphemes; each of a plurality of visually perceivable images is positioned adjacent to at least one of said graphemes, such that said adjacent image has a name including at least one phoneme of said at least one adjacent grapheme; each of a plurality of individually-activated, sound generating device is associated with at least one of said graphemes and generates at least one phoneme of said at least one grapheme and at least one sound pattern generating device for generating patterns of sounds comprising more than one of the phonemes generated by said plurality of sound generating devices to learn the phonemes associated with the graphemes used to form words.

17. An interactive teaching method of claim 16 further comprising the step of forming words and sentences phonetically with a set of reinforcing objects, each of which depicts at least one of said graphemes and said image positioned adjacent to said grapheme on said display and is color-coded with said distinctive color used to color-code said grapheme on said display.

* * * * *

UNITED STATES PATENT AND TRADEMARK OFFICE
CERTIFICATE OF CORRECTION

PATENT NO.   : 5,429,513

DATED        : July 4, 1995

INVENTOR(S)  : Ruth DIAZ-PLAJA

It is certified that error appears in the above-identified patent and that said Letters Patent is hereby corrected as shown below:

IN THE DRAWINGS:

Sheets 4, 6, 8, 10, 11 and 13 of the drawings, consisting of Figs. 4, 5B, 5D, 5F, 5G and 5I, should be deleted to be replaced with the sheets of drawings, consisting of the corrected Figs. 4, 5B, 5D, 5F, 5G and 5I, as shown on the attached pages.

Column 11, TABLE III, line 54, please insert the following text:

| | | | | |
|---|---|---|---|---|
| p  | Unvoiced | Consonant | Stop/Plosive | Bi-Labial |
| f  | Unvoiced | Consonant | Fricative Continuant | Labio-Dental |
| t  | Unvoiced | Consonant | Stop/Plosive | Lingua Alveolar |
| sh | Unvoiced | Consonant | Sibilant/Fricative/Continuant | Palatal |
| wh | Unvoiced | Consonant | Fricative-Continuant | Glottal/Bilabial |
| th | Unvoiced | Consonant | Stop/Fricative | Lingua Dental |
| s  | Unvoiced | Consonant | Sibilant/Fricative/Continuant | Lingua Alveolar |
| ch | Unvoiced | Consonant | Affricate/Stop | Palatal |

Signed and Sealed this

Thirtieth Day of January, 1996

Attest:

BRUCE LEHMAN

Attesting Officer

Commissioner of Patents and Trademarks

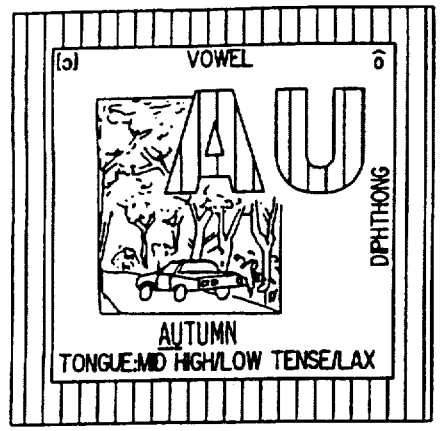
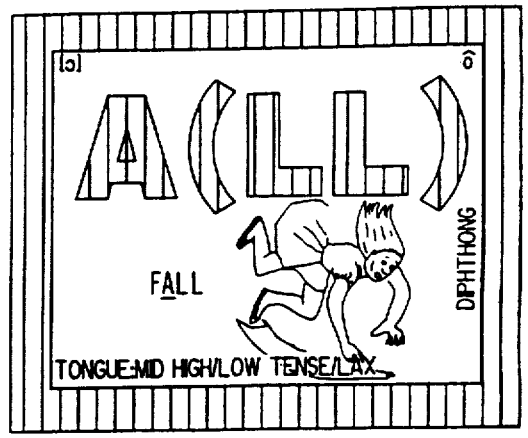
FIG. 5B
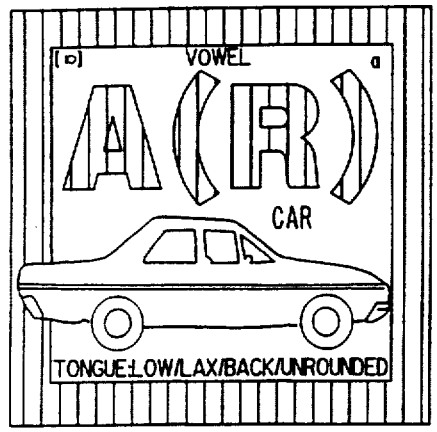
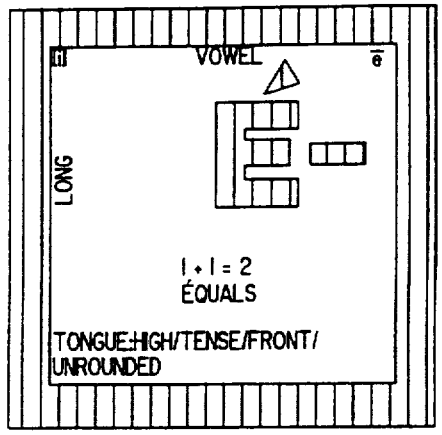
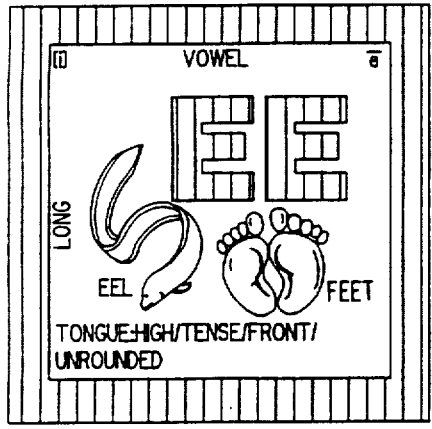
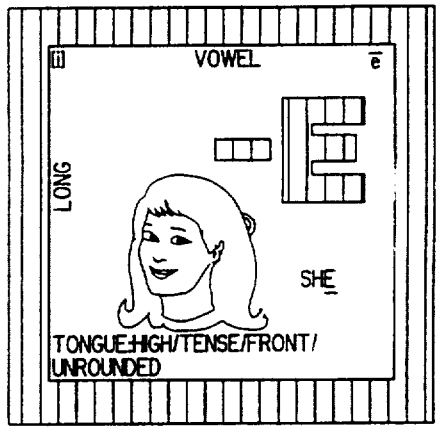
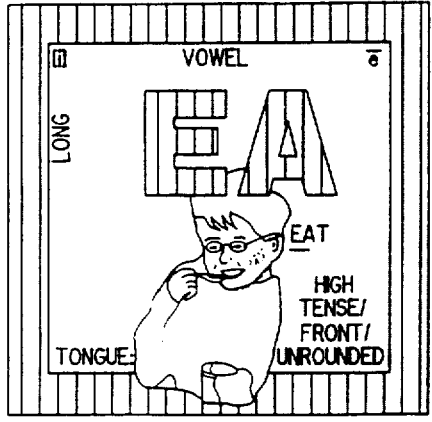
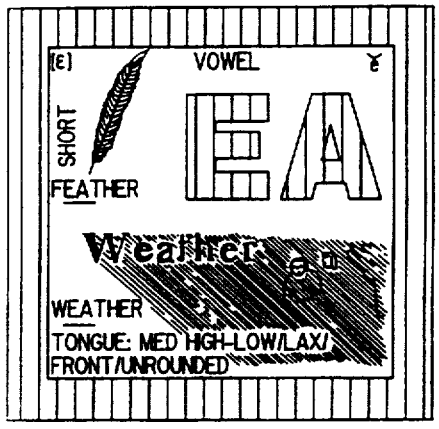

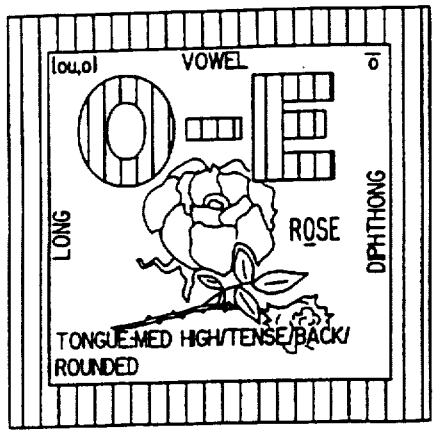
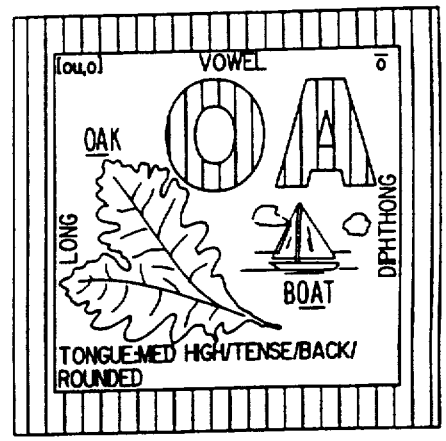
FIG. 5D
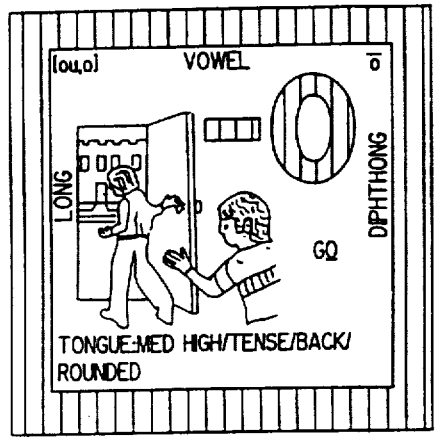
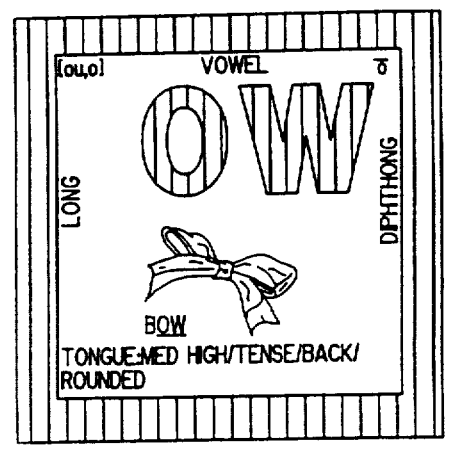
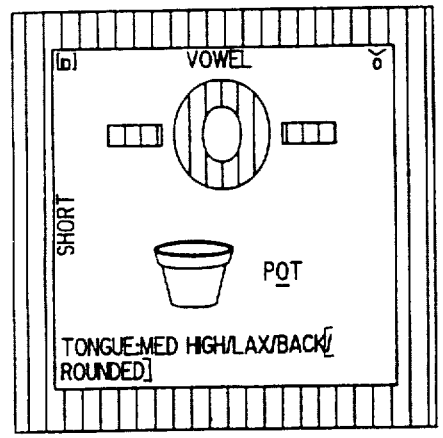
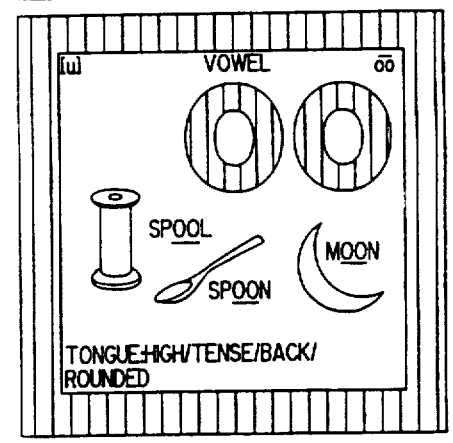
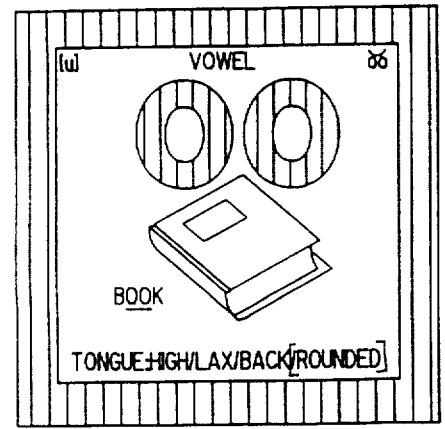
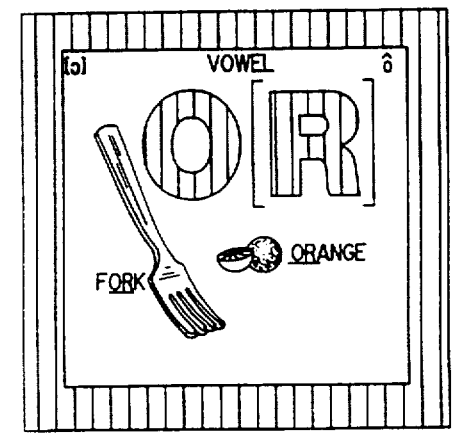

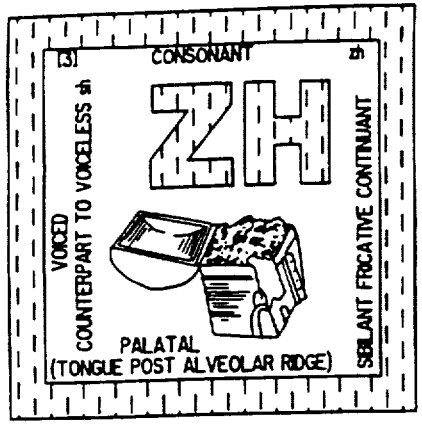
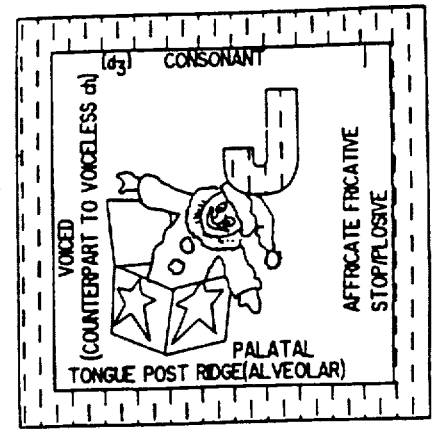
FIG. 5F
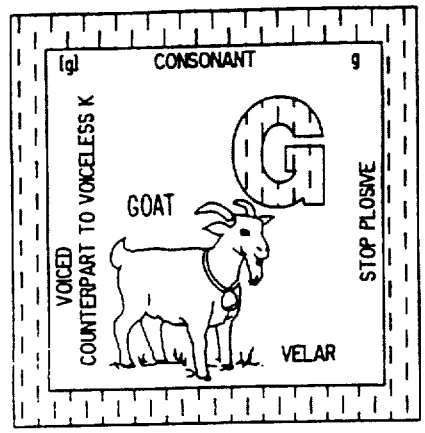
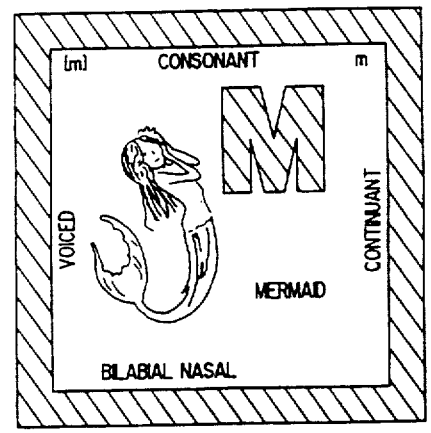
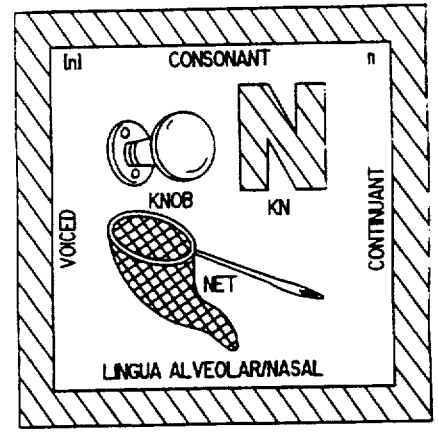
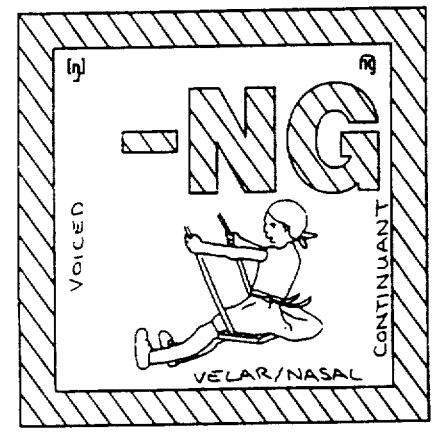
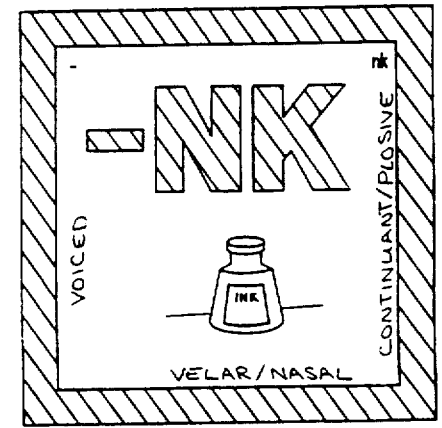

UNITED STATES PATENT AND TRADEMARK OFFICE
CERTIFICATE OF CORRECTION

PATENT NO. : 5,429,513
DATED : July 4, 1995
INVENTOR(S) : Ruth Diaz-Plaja

It is certified that error appears in the above-indentified patent and that said Letters Patent is hereby corrected as shown below:

On the title page, items [19] and [76], delete "Diaz-Plaza" and insert --Diaz-Plaja--.

Signed and Sealed this

Nineteenth Day of August, 1997

Attest:

BRUCE LEHMAN

Attesting Officer    Commissioner of Patents and Trademarks